United States Patent
Liu et al.

(10) Patent No.: US 7,598,792 B2
(45) Date of Patent: Oct. 6, 2009

(54) RESONANT GATE DRIVE CIRCUITS

(75) Inventors: Yan-Fei Liu, Kingston (CA); Zhihua Yang, Ottawa (CA); Wilson Eberle, Kingston (CA)

(73) Assignee: Queen's University at Kingston, Kingston, Ontario (CA)

( * ) Notice: Subject to any disclaimer, the term of this patent is extended or adjusted under 35 U.S.C. 154(b) by 3 days.

(21) Appl. No.: 11/266,486

(22) Filed: Nov. 4, 2005

(65) Prior Publication Data
US 2006/0170043 A1 Aug. 3, 2006

Related U.S. Application Data

(63) Continuation-in-part of application No. 11/045,055, filed on Jan. 31, 2005.

(51) Int. Cl.
*H03K 17/74* (2006.01)
(52) U.S. Cl. ..................... 327/494; 327/587
(58) Field of Classification Search ............... None
See application file for complete search history.

(56) References Cited

U.S. PATENT DOCUMENTS

| | | | |
|---|---|---|---|
| 4,677,346 A | 6/1987 | Roberts et al. | |
| 5,010,261 A | 4/1991 | Steigerwald | |
| 5,140,201 A | 8/1992 | Uenishi | |
| 5,179,512 A | 1/1993 | Fisher et al. | |
| 5,264,736 A | 11/1993 | Jacobson | |
| 5,434,522 A * | 7/1995 | Fikart et al. .................. 327/122 |
| 6,169,683 B1 | 1/2001 | Farrington | |
| 6,275,092 B1 * | 8/2001 | Maggio et al. ............... 327/424 |
| 6,344,768 B1 * | 2/2002 | Daun-Lindberg et al. ... 327/424 |
| 6,441,673 B1 | 8/2002 | Zhang | |
| 6,650,169 B2 | 11/2003 | Faye et al. | |
| 6,813,110 B2 * | 11/2004 | Leighton et al. ............... 360/68 |
| 7,061,279 B1 * | 6/2006 | Leete ........................... 327/65 |
| 7,106,536 B2 * | 9/2006 | Fang et al. ..................... 360/67 |

OTHER PUBLICATIONS

Alou, P., et al., "A new driving scheme for synchonous rectifiers: single winding self-driven synchronous rectification." *IEEE Transactions on Power Electronics*, 16: 803-811 (2001).
Chen, Y., et al., "A resonant MOSFET gate driver with complete energy recovery." *IEEE Power Electronics and Motion Control Conference, Proceedings, The Third International*, 1: 402-406 (2000).

(Continued)

*Primary Examiner*—Lincoln Donovan
*Assistant Examiner*—Khareem E. Almo
(74) *Attorney, Agent, or Firm*—Stephen J. Scribner; Carol Miernicki Steeg; Angela Lyon

(57) ABSTRACT

A resonate gate drive circuit for driving at least one power switching device recovers energy loss for charging and discharging the gate capacitance of the power switching devices. The gate drive circuit uses a current source to charge and discharge the gate capacitance with a high current, reducing the switching loss of the power switching device. The gate drive circuit comprises four semiconductor bidirectional conducting switching devices connected in a full-bridge configuration. An inductor connected across the bridge configuration provides the current source. The gate drive circuit may be used in single and dual high-side and low-side, symmetrical or complementary, power converter gate drive applications.

29 Claims, 32 Drawing Sheets

OTHER PUBLICATIONS

Chen, Y., et el., "A resonant MOSFET gate driver with efficient energy recovery." *IEEE Transactions on Power Electronics*, 19: 470-477 (2004).

Christoph, K.J., et al., "High frequency power MOSFET gate drive considerations." *HFPC Proceedings*, May pp. 173-180 (1988).

Cobos, J.A., et al., "New driving scheme for self driven synchronous rectifiers." *IEEE* pp. 840-846 (1999).

de Vries, I.D., "A resonant power MOSFET/IGBT gate driver." *IEEE* pp. 197-185 (2002).

Diaz, J., et al., "A new family of loss-less power MOSFET drivers." *IEEE* pp. 43-48 (1994).

Diaz, J., et al., "A new lossless power MOSFET driver based on simple DC/DC converters." *IEEE*, pp. 37-43 (1995).

Jacobson, B.S., et al., "High frequency resonant gate driver with partial energy recovery." *HFPC Proceedings*, May, pp. 133-141 (1993).

Leedham, R.J., et al., "Design of a high speed power MOSFET driver and its use in a half-bridge converter." *The European Power Electronics Association*, pp. 407-412 (1993).

López, T., et al., "A detailed analysis of a resonant gate driver for PWM applications" *IEEE* pp. 873-878 (2003).

Maksimovic, D., "A MOS gate drive with resonant transitions." *IEEE* pp. 527-532 (1991).

Panov, Y., et al., "Design considerations for 12-V/1.5-V, 50-A voltage regulator modules." *IEEE Transactions on Power Electronics* 16: 776-783 (2001); correction to "Design considerations for 12-V/1.5-V, 50-A voltage regulator modules." *IEEE Transactions on Power Electronics* 17: 152 (2002).

Strydom, J.T., "A comparison of fundamental gale-driver topologies for high frequency applications," *IEEE* pp. 1045-1052 (2004).

Weinberg, S.H., "A novel lossless resonant MOSFET driver." *IEEE* pp. 1003-1010 (1992).

Wiegman, H.L.N., "A resonant pulse gate drive for high frequency applications," *IEEE* pp. 738-743 (1992).

Yao, K., et al., "A novel resonant gate driver for high frequency synchronous buck converter" *IEEE* pp. 280-286 (2001).

Yao, K., et al., "A novel resonant gate driver for high frequency synchronous buck converters." *IEEE Transactions on Power Electronics* 17: 180-186 (2002).

\* cited by examiner

RESONANT GATE DRIVE CIRCUITS

RELATED APPLICATIONS

This application is a continuation-in-part of U.S. patent application Ser. No. 11/045,055, filed Jan. 31, 2005, the contents of which are incorporated herein by reference in their entirety. This application also claims the benefit of U.S. Provisional Patent Application Ser. No. 60/733,213 filed Nov. 4, 2005, the contents of which are incorporated herein by reference in their entirety.

FIELD OF THE INVENTION

This invention relates to DC-DC and AC-DC switching converters. More particularly, it relates to an effective way to turn on and to turn off the power switch that is used in such converters.

BACKGROUND OF THE INVENTION

Continued development of microprocessor and other integrated circuits introduces new challenges to the development of switching power converters. In order to reduce the passive component size, and also to meet stringent transient response requirements, the switching frequency of power converters will move into the MHz range in the next few years.

In high frequency, low power applications, the effect of the gate driver on the converter efficiency becomes more significant. As the operating frequency of power converters is raised, losses associated with driving the power MOSFET increase in proportion to the switching frequency. At low power levels the resulting penalty on the overall converter efficiency become significant. On the other hand, as power MOSFET die size is increased to reduce MOSFET on-resistance, the gate-source capacitance of the MOSFET increases in a proportional manner. Therefore, in low voltage, high current applications, the gate drive loss will also increase when low on-resistance MOSFETs are chosen to reduce the conduction loss. The gate drive losses can often offset advantages gained by the lower conduction losses.

Hence, lossless gate drive circuits have attracted much attention in recent years. Resonant gate drivers are an efficient alternative to the conventional methods to drive power MOSFETs. Many approaches have already been proposed, most of which are designed for a single MOSFET and are based on L-C resonance techniques (see, for example, "A MOS gate drive with resonant transitions", D. Maksimovic, IEEE PESC'91, pp. 527-532 (1991); "A resonant MOSFET gate driver with efficient energy recovery", Y. Chen, F. C. Lee, L. Amoroso, H. Wu, IEEE Transactions on Power Electronics, 19:470-477 (2004); "A resonant power MOSFET/IGBT gate driver", I. D. de Vries, IEEE, APEC'02, pp. 179-185 (2002)). A simple DC-DC converter and a transformer have been proposed in some solutions (e.g., "A new lossless power MOSFET driver based on simple DC/DC converters", J. Diaz, M. A. Perez, F. M. Linera, F. Aldana, IEEE PESC'95, pp. 37-43 (1995)). However, this approach makes the gate driver too complicated and limits the energy that can be recovered. In general, the above solutions can only recover limited gate driving loss and provide little other benefit.

In a synchronous buck converter, the switching loss of the high side MOSFET is another restriction which limits the switching frequency, as the switching loss is also proportional to the switching frequency.

A resonant gate driver for two MOSFETs in a synchronous buck converter was proposed by K. Yao and F. C. Lee in "A novel resonant gate driver for high frequency synchronous buck converters," IEEE Transactions on Power Electronics, 17:180-186 (2003), but the required control signals are difficult to generate, and the coupled inductor is expensive and difficult to design. Further, that solution does not reduce the switching loss of the top MOSFET.

The circuit proposed by Zhang (U.S. Pat. No. 6,441,673, issued Aug. 27, 2002) used a current source to charge the gate capacitance of the power switches. However, in that circuit, charging the gate capacitance with a low initial current resulted in the on-time of the power switch to be limited to a minimum of one-quarter of the resonant period of the L-C circuit, where C is the gate capacitance. This placed a limit on the extent to which switching time and switching loss of the power switch could be reduced.

The derivative of the current (di/dt) is another important issue if the switching frequency is to be increased. MOSFETs may be falsely triggered if the gate driver cannot clamp, or lock, the gate-source voltage of the MOSFET at less than its threshold value while the MOSFET is turned off.

The resonant gate drive circuits of the present invention address the above issues.

OBJECT OF THE INVENTION

One object of the invention is to provide a resonant gate drive circuit to reduce the gate drive loss and other losses for power switching devices having an input capacitance.

Another object of the invention is to provide a resonant gate drive circuit that can drive two separate power switching devices with symmetrical signals to reduce the gate drive loss and conduction loss of the power switching devices.

Another object of the invention is to provide a resonant gate drive circuit that can drive two separate power switching devices with complementary signals to reduce the gate drive loss and conduction loss of the power switching devices.

Another object of the invention is to provide a resonant gate drive circuit that can drive low-side and high-side power switching devices with complementary or symmetrical signals to reduce gate drive loss, switching loss, and conduction loss of the power switching devices.

SUMMARY OF THE INVENTION

According to one aspect of the invention there is provided a method of controlling operation of at least one power switching device having a gate capacitance, comprising:
  (i) charging the gate capacitance of a said power switching device using a current source, so that the power switching device is switched on, and then clamping the gate capacitance of the power switching device to a voltage source via a first low impedance path while the power switching device is on;
  (ii) discharging the gate capacitance of the said power switching device so that the power switching device is switched off, and then clamping the gate capacitance of the power switching device to a low voltage via a second low impedance path while the power switching device is off; and
  (iii) repeating steps (i) and (ii) as required to control operation of the said power switching device;
  wherein energy loss for charging and discharging the gate capacitance and switching loss of the said power switching device are reduced.

In one embodiment, the method may further comprise (iv) carrying out steps (i) to (iii) on first and second power switching devices alternately such that the first and second power switching devices are not on simultaneously.

In another embodiment the method may further comprise (iv) carrying out steps (i) to (iii) on first and second power switching devices such that the first power switching device is switched off and on again while the second power switching device is on, and the second power switching device is switched off and on again while the first power switching device is on.

The power switching device may be MOSFET, IGBT, or MCT. Preferably, the power switching device is MOSFET. At least one power switching device may comprise a plurality of power switching devices connected in parallel.

The low voltage may be approximately ground of the circuit, or the low voltage may be equal to or lower than that required to maintain the power switching device in an off state.

According to another aspect of the invention there is provided a resonant gate drive circuit for controlling operation of at least one power switching device having a gate capacitance, comprising: a current source; and a switching circuit for connecting the current source, a voltage source, or a low voltage to the gate capacitance of the at least one power switching device at a selected instant in time; wherein said connecting controls operation of the at least one power switching device.

The switching circuit may comprise a plurality of switches that direct the flow of current to charge and discharge the gate capacitance of the at least one power switching device. In one embodiment, the switching circuit comprises four switches connected in a full-bridge configuration, that direct the flow of current to charge and discharge the gate capacitance of the at least one power switching device.

The current source may comprise an inductor connected across the bridge. The low voltage may be approximately ground of the circuit, or it may be equal to or less than the voltage required to maintain the power switching device in an off-state.

In one embodiment, the resonant gate drive circuit controls operation of a single power switching device. The resonant gate drive circuit may further comprise a capacitor.

The at least one power switching device may comprise a plurality of power switching devices connected in parallel. The at least one power switching device may be MOSFET, IGBT, or MCT. Preferably, the at least one power switching device is MOSFET.

According to another aspect of the invention there is provided a resonant gate drive circuit for controlling operation of at least one power switching device having a gate capacitance, comprising:
  an input terminal for receiving a DC voltage;
  a first leg connected between the input terminal and a circuit common, the first leg comprising two switches connected in series at a first node;
  a second leg connected between the input terminal and the circuit common, the second leg comprising two switches connected in series at a second node; and
  an inductor connected between the first node and the second node,
  wherein the gate capacitance of at least one power switching device is connected to one of the first node and the second node.

The resonant gate drive circuit may further comprise a diode with anode connected to the input terminal and cathode connected to the first and second legs; and a capacitor connected in parallel with the first leg; wherein the gate capacitance of the at least one power switching device is connected to the second node.

In one embodiment, the gate capacitance of a first power switching device is connected to the first node and the gate capacitance of a second power switching device is connected to the second node. The at least one power switching device may comprise a plurality of power switching devices connected in parallel. The at least one power switching device may be MOSFET, IGBT, or MCT. Preferably, the at least one power switching device is MOSFET.

In another embodiment, the resonant gate drive circuit further comprises a capacitor connected in series with the inductor, between the first node and the second node.

In another embodiment, the resonant gate drive circuit comprises:
  an input terminal for receiving a DC voltage;
  a first leg connected between the input terminal and a circuit common, the first leg comprising two switches connected in series at a first node;
  a diode with anode connected to the input terminal;
  a second leg connected between the cathode of the diode and a floating point, the second leg comprising two switches connected in series at a second node and a capacitor connected in parallel with the second leg; and
  a series circuit comprising an inductor and a capacitor connected between the first node and the second node,
  wherein the gate capacitance of a first power switching device is connected between the first node and the circuit common, and the gate capacitance of a second power switching device is connected between the second node and the floating point.

According to another aspect of the invention there is provided a method of controlling operation of the power switches of a synchronous buck converter, comprising:
  using a low-side resonant gate drive circuit as described herein to drive the low-side power switching device of the buck converter; and
  using a high-side resonant gate drive circuit as described herein to drive the high-side power switching device of the buck converter.

BRIEF DESCRIPTION OF THE DRAWINGS

For better understanding of the invention and to show more clearly how it may be carried into effect, reference will be made, by way of example, to the accompanying drawings which show preferred embodiments of the invention and in which.

DETAILED DESCRIPTION OF PREFERRED EMBODIMENTS

This invention relates to a new resonant gate drive scheme that can control a power switching device having gate capacitance, sometimes referred to herein as a gate capacitor. Examples of such devices include, but are not limited to, MOSFET (Metal Oxide Semiconductor Field Effect Transistor), IGBT (Insulated Gate Bipolar Transistor), MCT (MOS Controlled Thyristor), and BJT (bipolar junction transistor, in which case a body diode is required). For this description, the term MOSFET will be used as a non-limiting example for all such devices.

Figure 1:
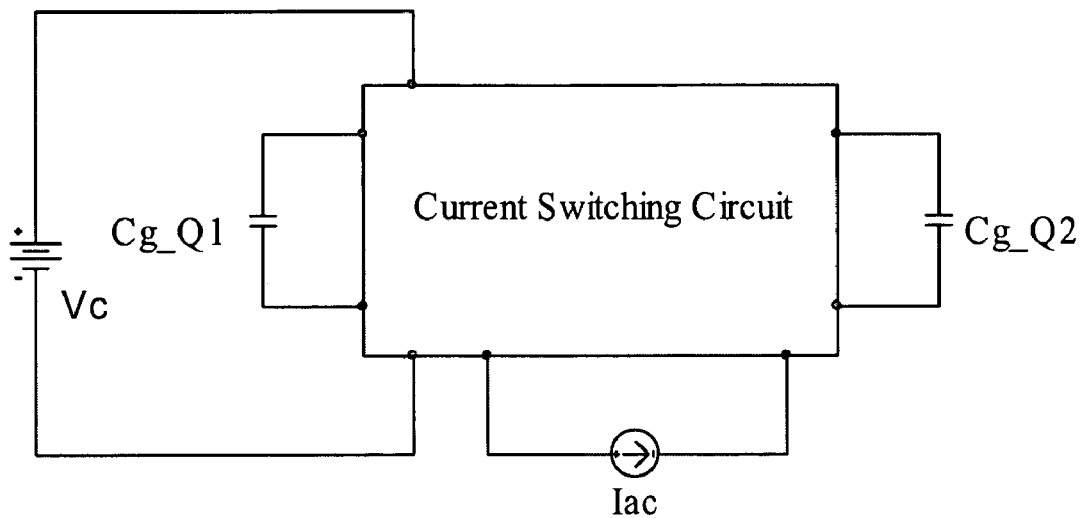
FIG. 1 is a block diagram of the resonant gate drive circuit according to one embodiment of the present invention.

The resonant gate drive scheme of the invention may control two or more separate power switching devices, or it may control a single power switching device, depending on how it is configured. It reduces not only the gate drive loss, but also the switching loss of the power switching devices. It can also eliminate the false triggering problem mentioned above. Moreover, since the gate drive circuit may be configured numerous ways, it can be widely used. A general block diagram of a gate drive circuit of the invention is shown in FIG. 1. In the figure, Cg_Q1, Cg_Q2 are the gate capacitances of the power switches that are charged and discharged during operation of the gate drive circuit. Vc is a voltage source, and Iac is an alternating current source. For half the switching period, Iac is positive and for the other half of the switching period, its value is negative. The current switching circuit is used to direct the current source, Iac, to charge and discharge gate capacitances Cg_Q1 and Cg_Q2 at desired time instants. The operation of the current switching circuit is such that the peak value, or close to the peak value of Iac, is used to charge and discharge the gate capacitances initially and throughout the charging and discharging intervals. This avoids any limitation on the minimum on-time of the power switch that would otherwise be imposed by the resonant period of the L-C circuit (where L is a characteristic of the current source and C is the gate capacitance of the power switching device).

The current switching circuit can also clamp the voltage across Cg_Q1 and Cg_Q2 at either around zero or around Vc. Preferably, clamping of the gate capacitance voltage at about either zero or the supply voltage is done through a low impedance path. Switches of the current switching circuit may therefore be chosen to minimize such impedance. Two advantages of this arrangement are: (1) the gate drive loss of the power switching device can be reduced; and (2) Cg_Q1 and Cg_Q2 can be charged and discharged quickly and thus benefit the operation of the power switching device, such as a MOSFET.

Figure 2:
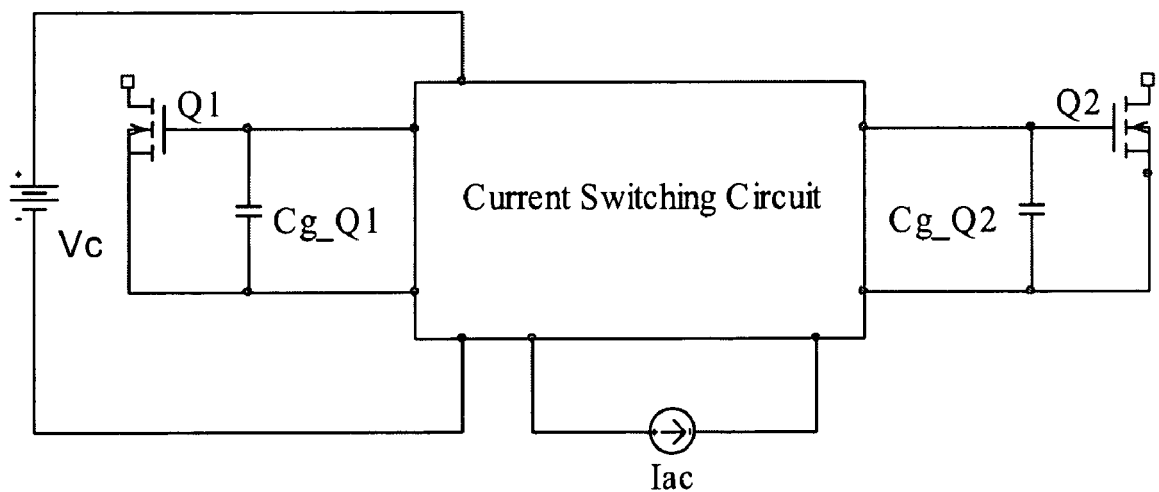
FIG. 2 is a block diagram of the resonant gate drive circuit for two MOSFETs.

The circuit shown in FIG. 1 may be used to control two separate power switching devices, as shown in FIG. 2. For example, Cg_Q1 is the gate capacitance of one MOSFET, Q1, and Cg_Q2 is the gate capacitance of another MOSFET, Q2. In some applications, Q1 and/or Q2 may consist of two or more power switching devices connected in parallel.

Figure 3:
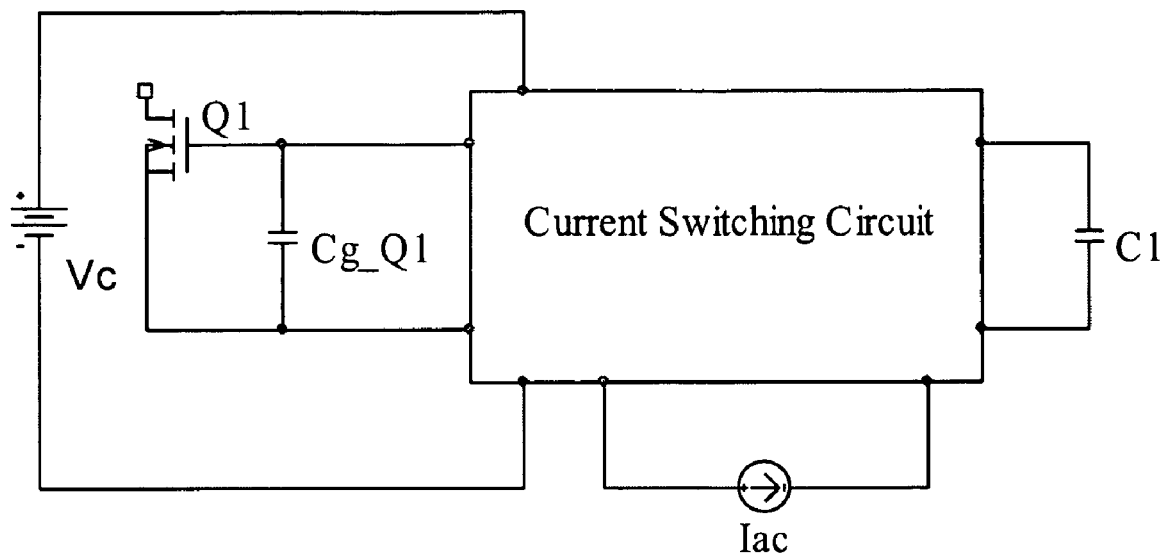
FIG. 3 is a block diagram of the resonant gate drive circuit for one MOSFET.

The circuit shown in FIG. 1 may also be used to control one power switching device, as shown in FIG. 3. In this case, Cg_Q1 is the gate capacitance of MOSFET Q1. C1 is an added capacitor. In some applications, Q1 may consist of two or more power switching devices connected in parallel.

Four embodiments of the resonant gate drive circuit, for applications in different types of power converters, are discussed below. The first circuit is for dual low-side symmetrical MOSFET drive. The second circuit is for dual low-side complementary MOSFET drive. The third circuit is for dual high-side and low-side complementary or symmetrical MOSFET drive. A fourth embodiment is for single high side or low side power switch drive. These circuits can be used to cover most switching converter topologies. Advantages of these circuits are reduced gate drive loss, reduced switching loss, which is achieved by reducing the switching time, and reduced conduction loss of the switch in the on state.

These embodiments, preferred implementation, and their operation are described in detail in the following sections.

1 Dual Low-Side Symmetrical Resonant Gate Drive Circuit

This section discusses in detail, with circuit topology, operation of the resonant gate drive circuit for a dual low-side symmetrical MOSFET drive. For example, it may be used to drive synchronous rectifiers in a current doubler configuration (e.g., FIG. 5). It may also be used to drive the primary MOSFET in both current fed push-pull converters (e.g., FIG. 6) and voltage-fed push pull converters (e.g., FIG. 7). The circuit may also be used in other power converters as will be evident to one skilled in the art.

1.1 Topology

Figure 4:
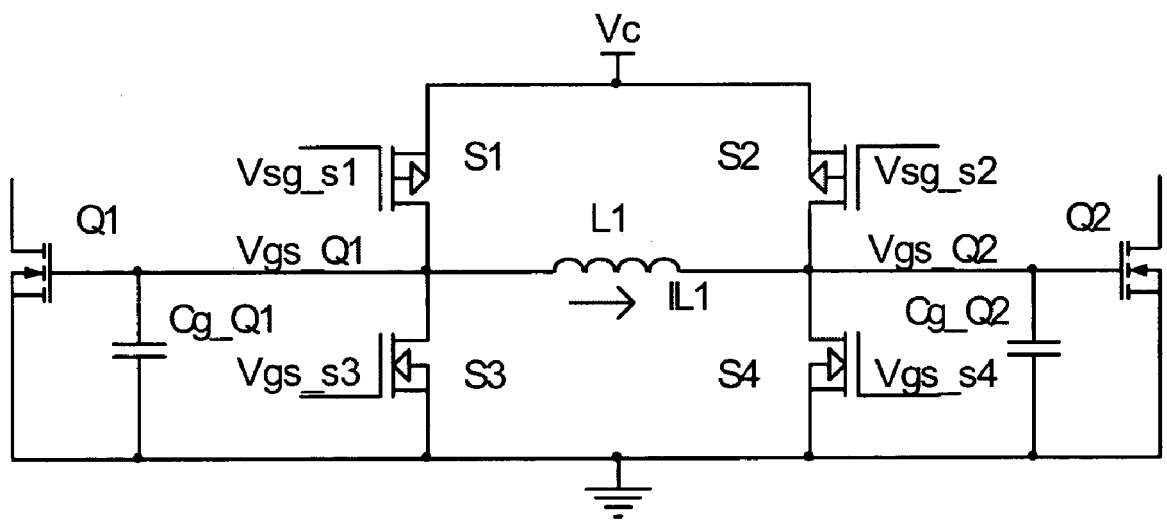
FIG. 4 is a schematic diagram of a dual low-side symmetrical resonant gate drive circuit.

A resonant gate drive circuit for dual low-side symmetrical MOSFET drive is shown in FIG. 4. The circuit consists of four switches, S1-S4, connected in a bridge (e.g., full bridge) configuration, and one inductor, L1, connected across the bridge. Gate capacitances, Cg_Q1 and Cg_Q2, are the load of the resonant gate drive circuit. Vc is the voltage source. To simplify the implementation, P-channel MOSFETs are used for S1 and S2, and N-channel MOSFETs are used for S3 and S4. It is noted that other implementation methods may also be used to achieve same objective. Other suitable devices for switches S1-S4 include, for example, BJTs (bipolar junction transistors), IGBTs, and diodes.

The resonant gate drive circuit shown in FIG. 4 charges and discharges gate capacitances Cg_Q1 and Cg_Q2 with minimum energy loss and as quickly as possible. When the capacitor voltage is high, the MOSFET is turned on and when the capacitor voltage is low, the MOSFET is turned off. With this circuit, the duty cycles of the voltages across Cg_Q1 and Cg_Q2 are same. The duty cycle may be higher than 0.5, equal to 0.5, or lower than 0.5. The actual duty cycle will be decided by the gate drive signals for S1-S4. The duty cycle D is defined as the ratio between the time when the MOSFET is on and the switching period, or D=Ton/Ts, where Ton is the MOSFET on time and Ts is switching period.

Figure 5:
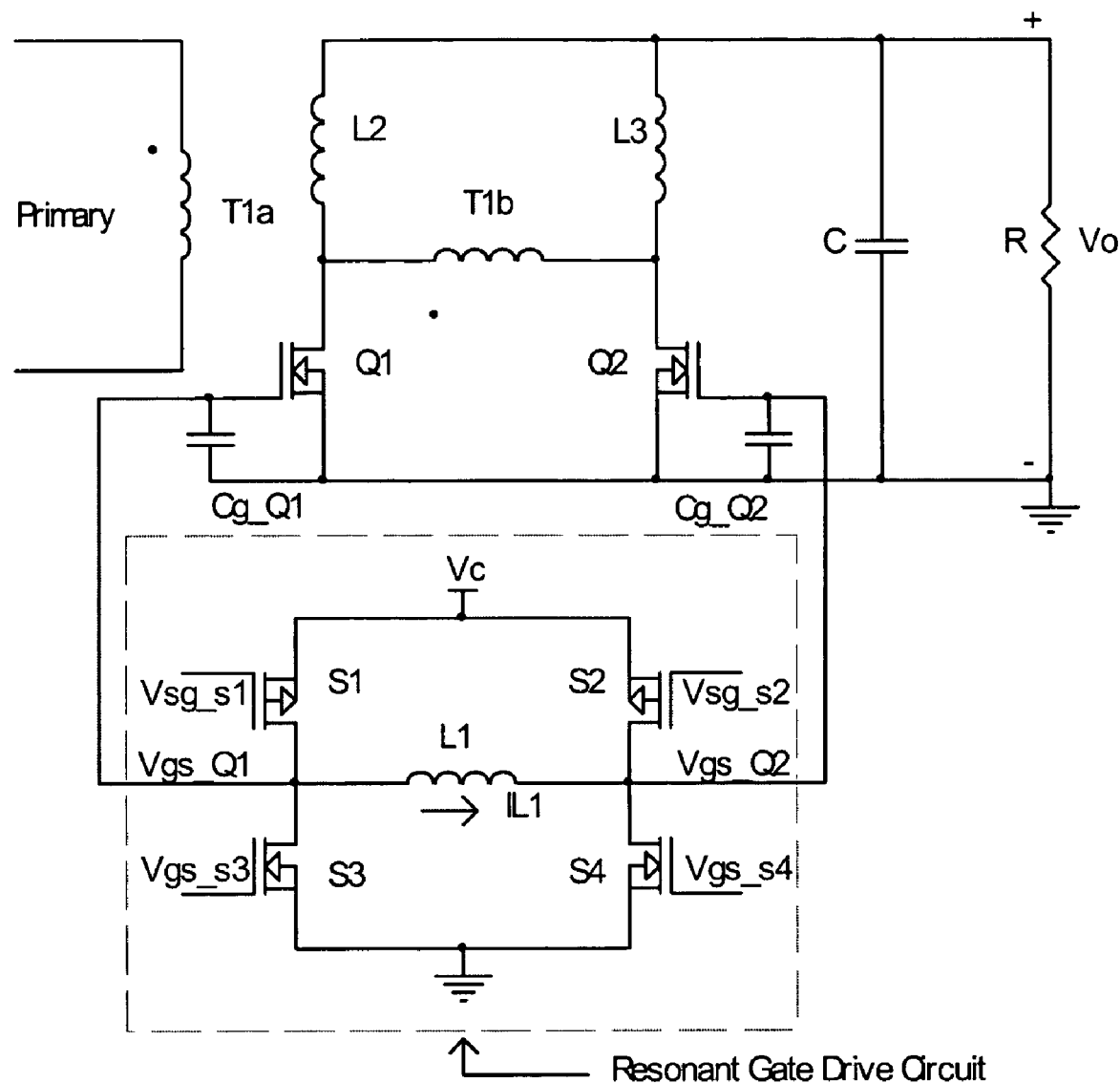
FIG. 5 is a schematic diagram of a current doubler with a dual low-side symmetrical resonant gate drive circuit.

FIG. 5 shows the circuit when the dual low-side symmetrical resonant gate drive circuit is used to drive the synchronous rectifiers of a current doubler circuit. In the circuit, Q1 and Q2 are MOSFETs used as a synchronous rectifier. Cg_Q1 and Cg_Q2 represent the gate capacitances of MOSFET Q1 and Q2, respectively. In this circuit, the duty cycles for Q1 and Q2 are same and the duty cycle is larger than 50%.

With the resonant gate drive circuit, the energy stored in the gate of Q1 and Q2 is recovered. In addition, the turn on and turn off time of Q1 and Q2 are also reduced, which reduces their conduction loss.

Figure 6:
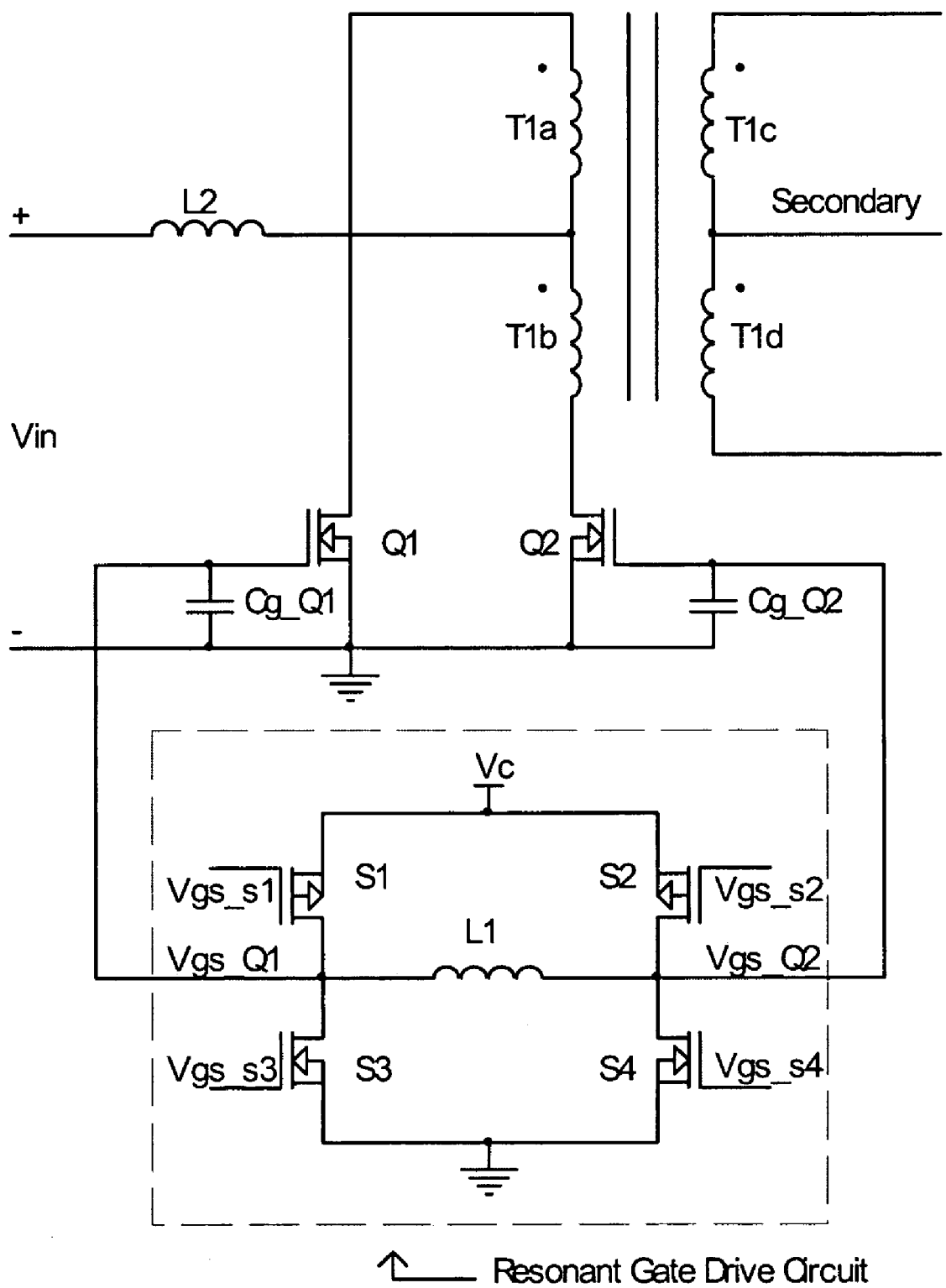
FIG. 6 is a schematic diagram of a current fed push-pull converter with a dual low-side resonant gate drive circuit.

The resonant gate drive circuit may also be used in other switching power converters. FIG. 6 shows a current fed push-pull converter with a resonant gate drive circuit to drive the primary side MOSFETs, Q1 and Q2. In this converter, the duty cycle for Q1 and Q2 is same and is larger than 50%.

Figure 7:
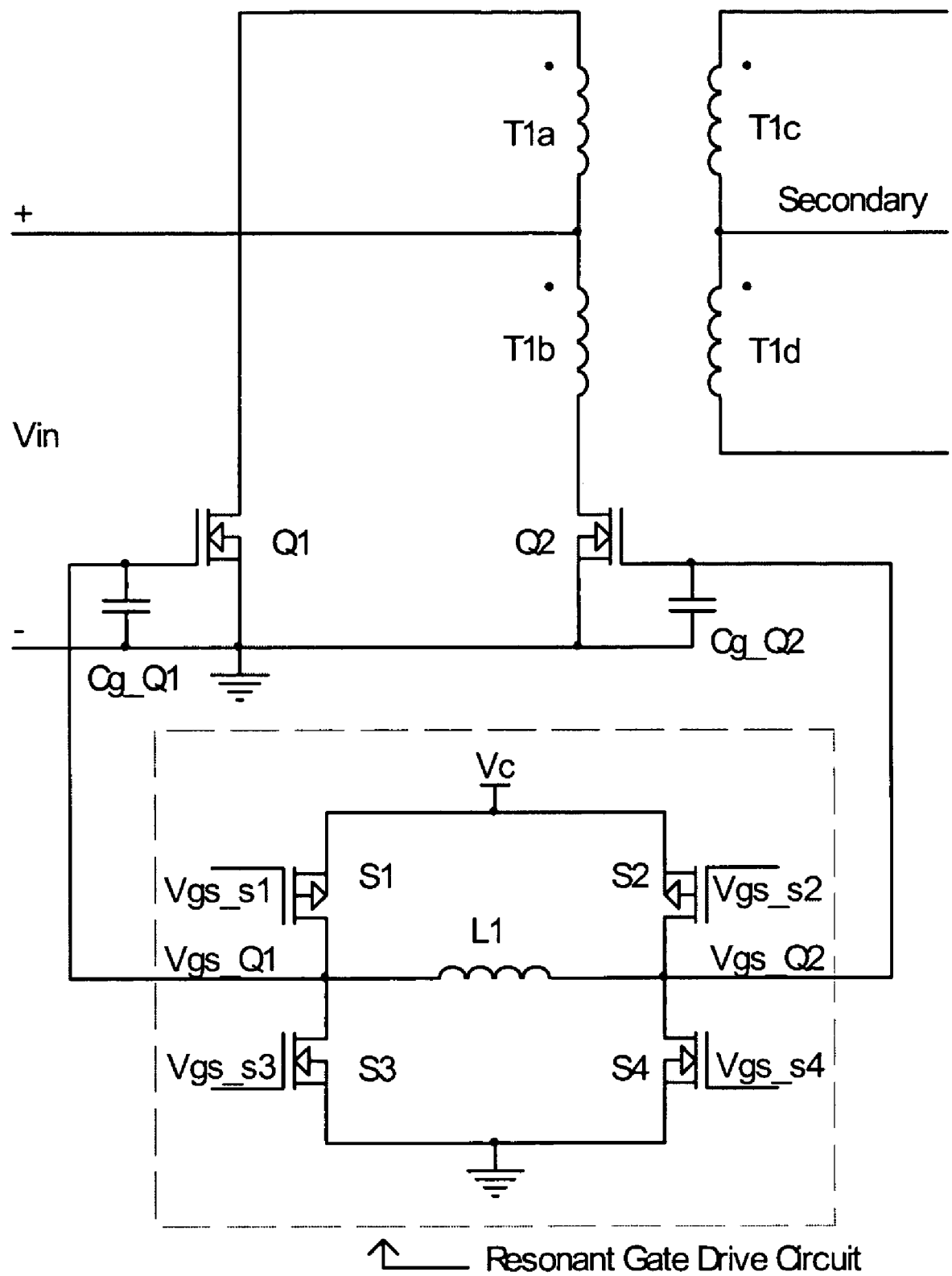
FIG. 7 is a schematic diagram of a voltage fed push-pull converter with a dual low-side resonant gate drive circuit.

The resonant gate drive circuit shown in FIG. 4 may also be used for power converters when the duty cycle is less than 0.5. FIG. 7 shows a voltage fed push-pull converter with a resonant gate drive circuit. In this converter, the duty cycle for Q1 and Q2 is the same and is less than 0.5.

With different gate drive signals to S1, S2, S3, and S4, the duty cycle for Q1 and Q2 may be changed from below 0.5, to 0.5 and to above 0.5. The following sections describe the operation of the resonant gate drive circuit, as shown in FIG. 4, under different duty cycle conditions.

Operation for D>0.5

Figure 8:
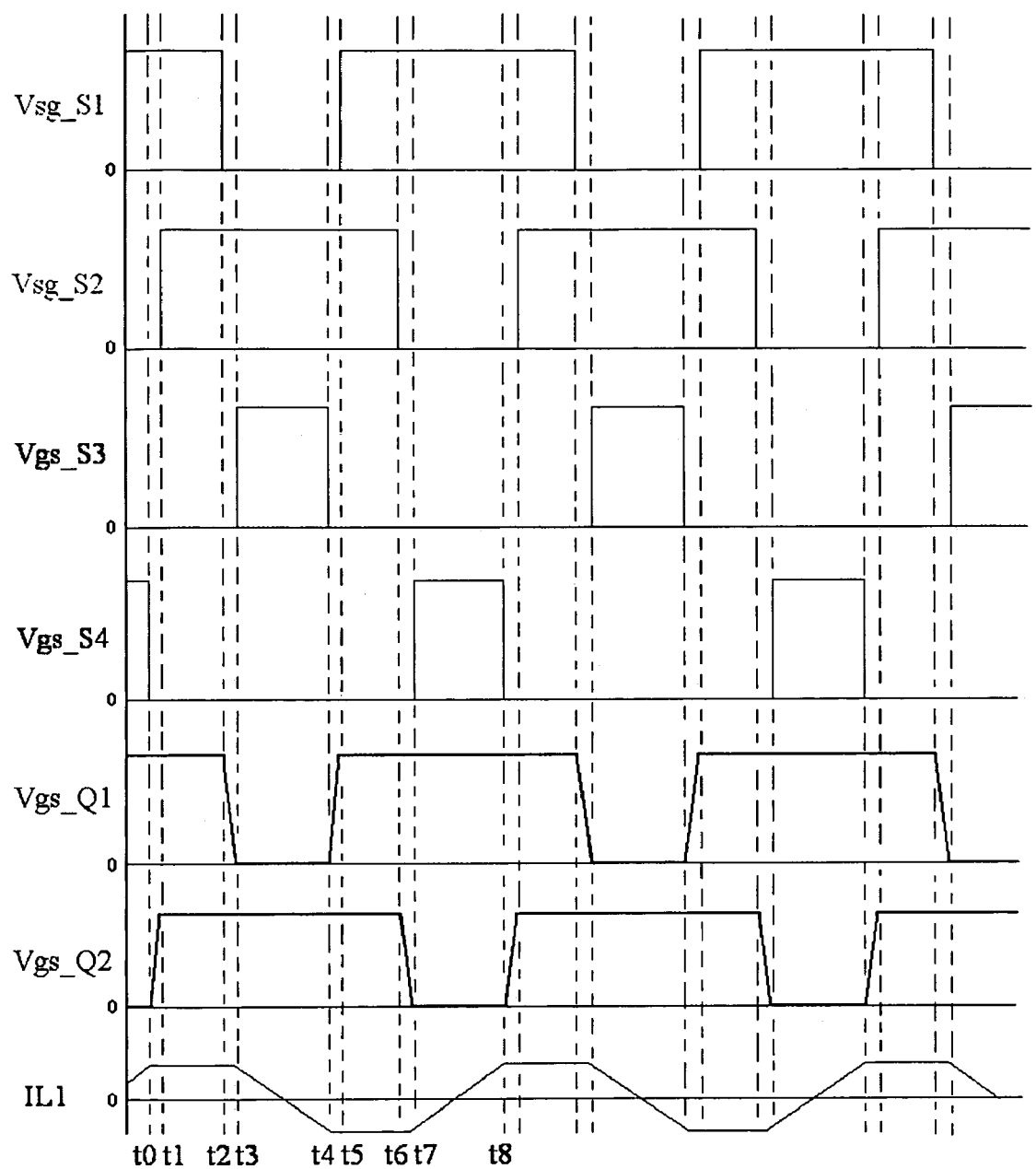
FIG. 8 shows the key waveforms for a dual low-side symmetrical resonant gate drive circuit when D>0.5.

When the duty cycle is larger than 0.5, the operation of the dual low-side symmetrical resonant gate drive circuit, as shown in FIG. 4, can be analyzed by the key waveforms shown in FIG. 8. In the figure, Vsg_S1, Vsg_S2, Vgs_S3, and Vgs_S4 are gate drive signals for S1-S4. Vgs_Q1 and Vgs_Q2 are the voltage across Cg_Q1 and Cg_Q2. The rising edge and falling edge of Vgs_Q1 and Vgs_Q2 are shown to illustrate the details of the charging and discharging interval. IL1 is the current waveform through inductor L1.

The following describes in detail the operation of the dual low-side symmetrical resonant gate drive circuit for D>0.5. Refer to the key waveforms in FIG. 8 and circuit in FIG. 4.

Before t0:

S1, S4 are on and S2, S3 are off. Q1 is on and Q2 is off. Inductor current IL1 increases to maximum value at t0.

From t0 to t1:

S4 is turned off at t0. Inductor L1 resonates with the gate capacitor of MOSFET Q2, Cg_Q2. Cg_Q2 is charged during this period. The voltage across Cg_Q2 increases and it is clamped to the source voltage Vc by the body diode of S2 before t1. Q2 is turned on in this time interval. At t1, S2 turns on with zero voltage. By controlling the turn-off instant for S4 (t0), the turn-on instant of Q2 can be controlled.

From t1 to t2:

S1, S2 are on and S3, S4 are off. Both Q1 and Q2 are on and inductor current IL1 is circulating through S1 and S2 and remains constant in this interval.

From t2 to t3:

S1 is turned off at t2 with zero voltage. Inductor L1 resonates with the gate capacitor of MOSFET Q1, Cg_Q1. Cg_Q1 is discharged during this period. The voltage across Cg_Q1 decreases and it is clamped to zero by the body diode of S3 before t3. Q1 is turned off in this time interval. At t3, S3 turns on with zero voltage. By controlling the turn-off instant of S1 (t2), the turn-off instant of Q1 can be controlled.

From t3 to t4:

S2, S3 are on and S1, S4 are off. Q1 is off and Q2 is on. The inductor current IL1 decreases to zero and then it increases in the opposite direction. It reaches the negative maximum at t4.

From t4 to t5:

S3 is turned off at t4. Inductor L1 resonates with capacitor Cg_Q1. Cg_Q1 is charged during this interval. The voltage across Cg_Q1 increases and it is clamped to the source voltage Vc by the body diode of S1 before t5. Q1 is turned on in this time interval. At t5, S1 turns on with zero voltage. By controlling the turn off instant of S3 (t4), the turn-on instant of Q1 can be controlled.

From t5 to t6:

S1, S2 are on and S3, S4 are off. Both Q1 and Q2 are on and inductor current IL1 circulates through S1 and S2 and remains constant in this interval.

From t6 to t7:

S2 is turned off at t6 with zero voltage. Inductor L1 resonates with capacitor Cg_Q2. Cg_Q2 is discharged during this period. The voltage across Cg_Q2 decreases and it is clamped to zero by the body diode of S4 before t7. Q2 is turned off in this time interval. At t7, S4 turns on with zero voltage. By controlling the turn off instant for S2 (t6), the turn-off instant of Q2 can be controlled.

From t7 to t8:

S1, S4 are on and S2, S3 are off. Q1 is on and Q2 is off. The negative inductor current rises through zero and then further increases. The value of the current IL1 increases to positive maximum at t8. The next cycle starts at t8.

1.2 Operation for D=0.5

Figure 9:
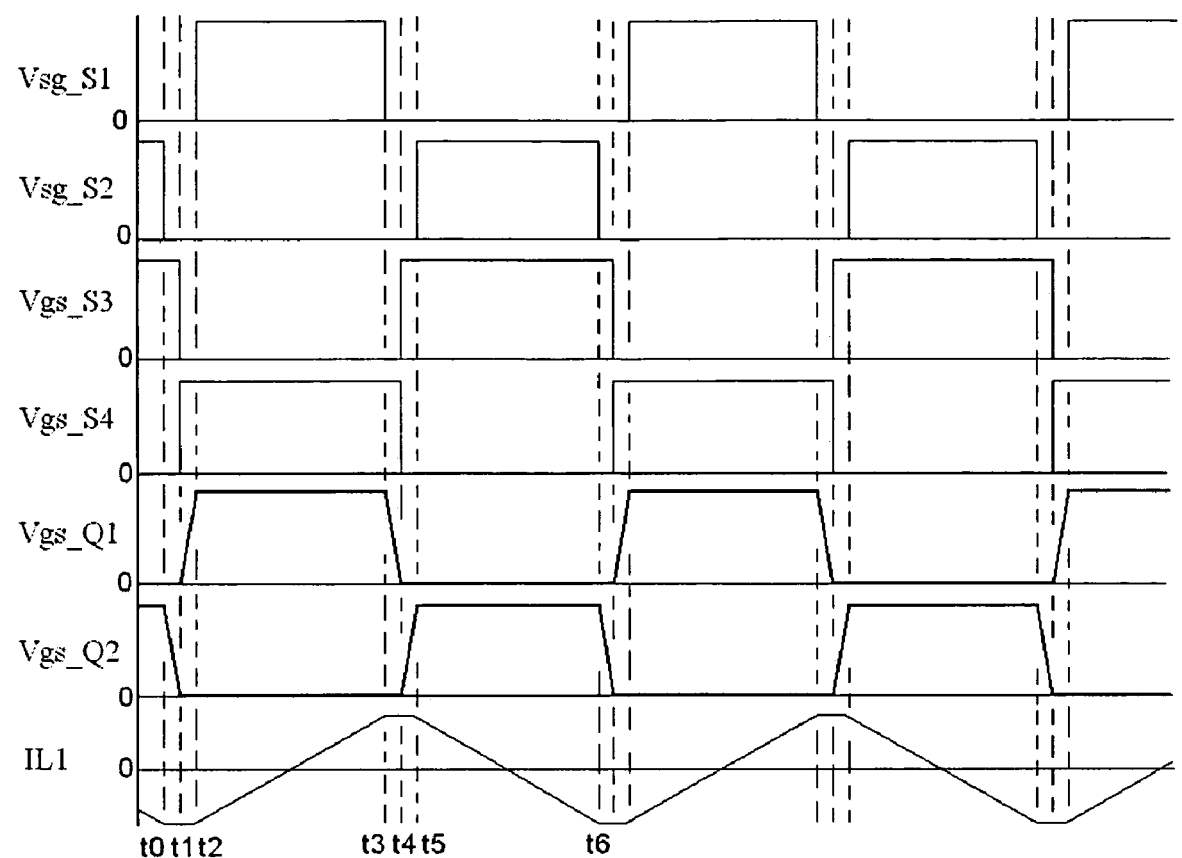
FIG. 9 shows the key waveforms for a dual low-side symmetrical resonant gate drive circuit when D=0.5.

When the duty cycle equals 0.5, the operation of the dual low-side symmetrical resonant gate drive circuit, as shown in FIG. 4 and FIG. 5, can be analyzed by the key waveforms shown in FIG. 9. The operation is similar to that for D>0.5 (see above). In the figure, Vsg_S1, Vsg_S2, Vgs_S3, and Vgs_S4 are gate drive signals for S1-S4. Vgs_Q1 and Vgs_Q2 are the voltages across Cg_Q1 and Cg_Q2. The rising edge and falling edge of Vgs_Q1 and Vgs_Q2 are shown to illustrate the details of the charging and discharging interval. IL1 is the current waveform through inductor L1.

1.3 Operation for D<0.5

Figure 10:
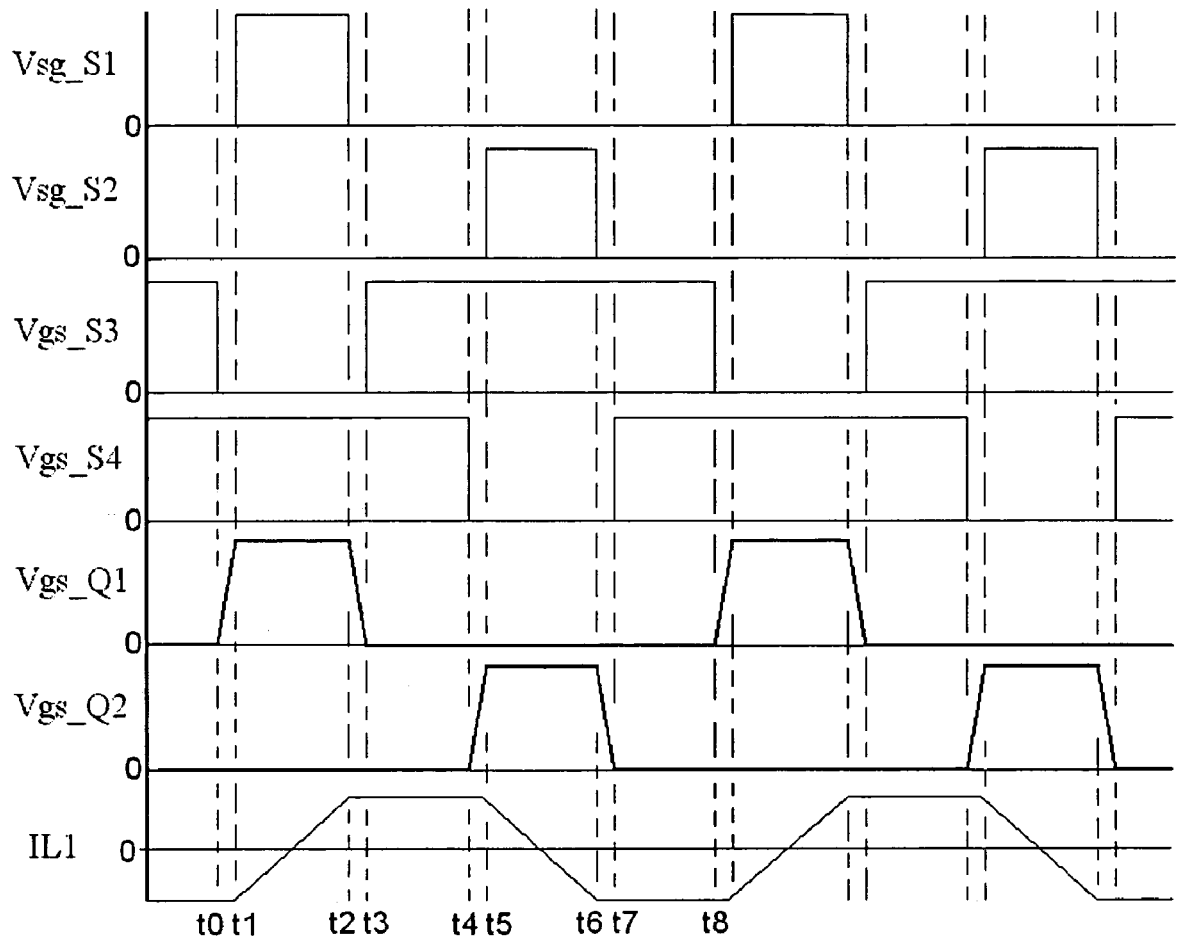
FIG. 10 shows the key waveforms for a dual low-side symmetrical resonant gate drive circuit when D<0.5.

When the duty cycle is less than 0.5, the operation of the dual low-side symmetrical resonant gate drive circuit, as shown in FIG. 4 and FIG. 5, can be analyzed by key waveforms shown in FIG. 10. The operation is similar to that for D>0.5 (see above). In the figure, Vsg_S1, Vsg_S2, Vgs_S3, and Vgs_S4 are gate drive signals for S1-S4. Vgs_Q1 and Vgs_Q2 are the voltages across Cg_Q1 and Cg_Q2. The rising edge and falling edge of Vgs_Q1 and Vgs_Q2 are shown to illustrate the details of the charging and discharging interval. IL1 is the current waveform through inductor L1.

2 Dual Low-Side Complementary Resonant Gate Drive Circuit

This section discusses in detail the circuit topology and operation of a resonant gate drive circuit for a dual low-side complementary MOSFET drive. For example, the circuit may be used to drive the synchronous rectifiers for a forward converter. The circuit may also be used for other power converters as will be evident to one skilled in the art.

2.1 Topology

Figure 11:
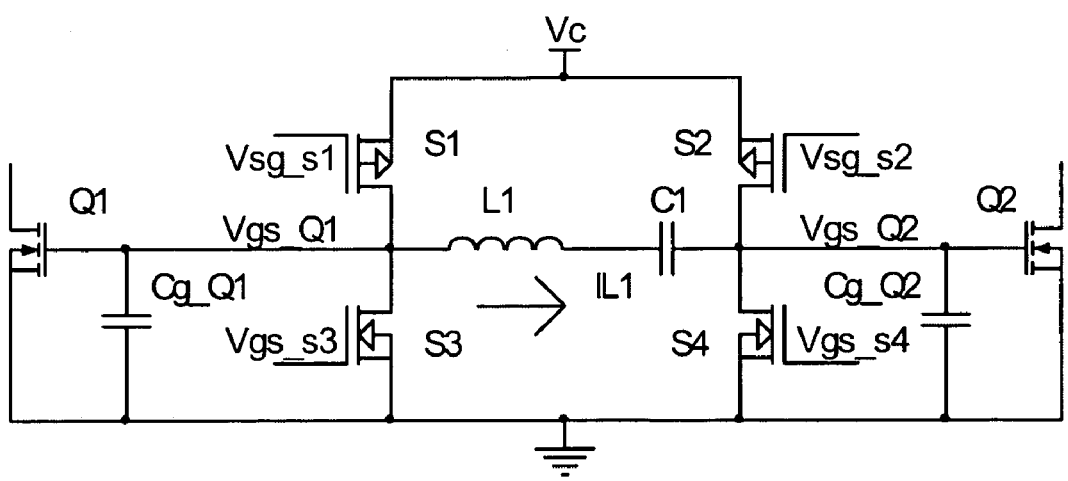
FIG. 11 is a schematic diagram of a dual low-side complementary resonant gate drive circuit.

The resonant gate drive circuit for dual low-side complementary MOSFET drive is shown in FIG. 11. Similar to the dual low-side symmetrical resonant gate drive circuit shown in FIG. 4, the circuit consists of four switches, S1-S4, connected in a bridge configuration, and one inductor, L1, connected across the bridge. Capacitor C1 is in series with the inductor L1. This capacitor is used to block the DC current flowing through the inductor L1. Gate capacitors Cg_Q1 and Cg_Q2 are the load of the resonant gate drive circuit. Vc is the voltage source.

The circuit shown in FIG. 11 charges and discharges gate capacitances Cg_Q1 and Cg_Q2 with minimum energy loss and as quickly as possible. With this circuit, the duty cycles of the voltage across Cg_Q1 and Cg_Q2 are complementary. That is, if the duty cycle for the voltage across Cg_Q1 is D, then the duty cycle for the voltage across Cg_Q2 is 1−D. In order to simplify the implementation, P-channel MOSFETs are used for S1 and S2 and N-channel MOSFETs are used for S3 and S4. It is noted that other implementations may also be used to achieve the same effect.

Figure 12:
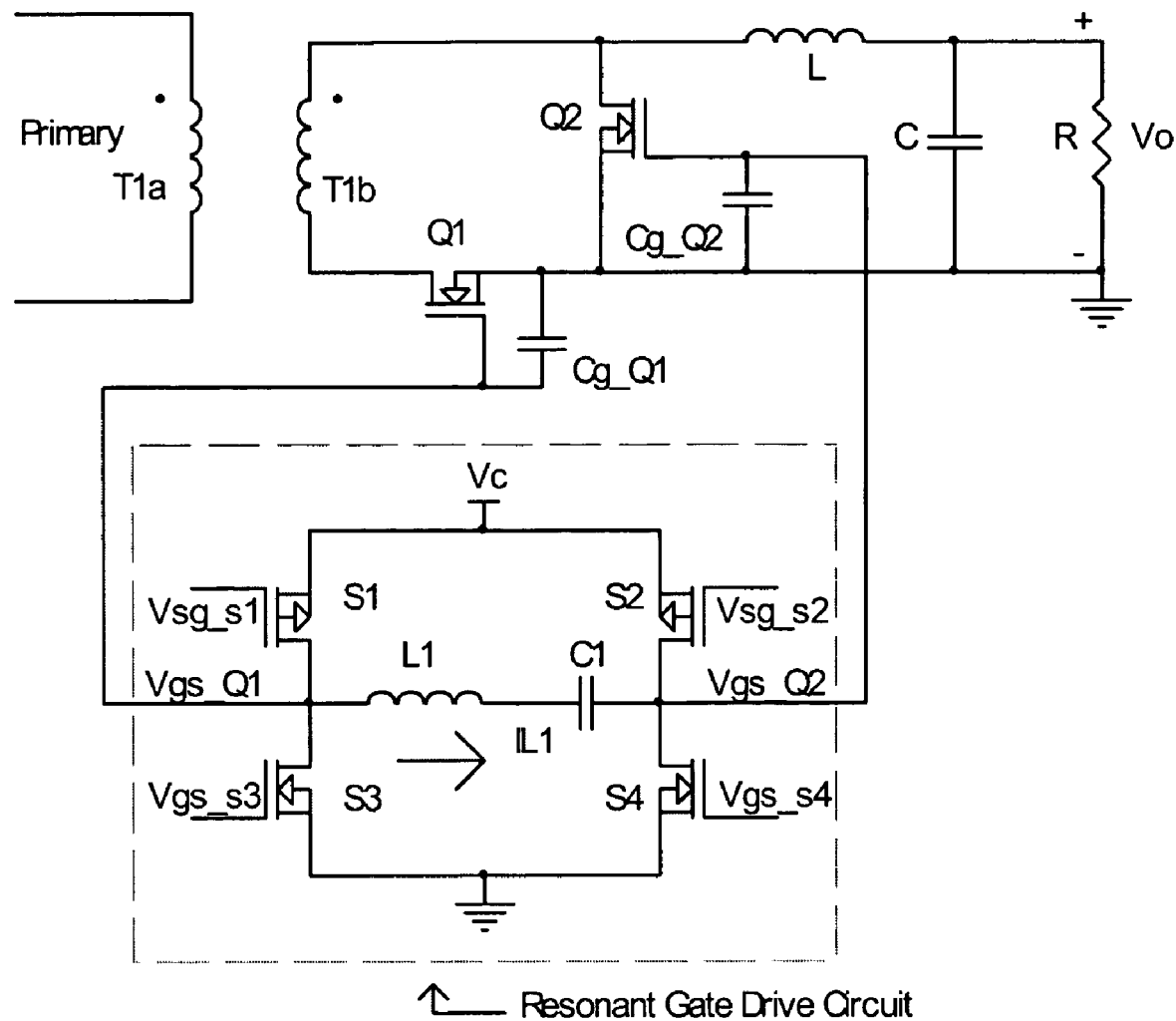
FIG. 12 is a schematic diagram of a forward converter with a dual low-side complementary resonant gate drive circuit.

FIG. 12 shows the circuit when the dual low-side complementary resonant gate drive circuit is used to drive the synchronous rectifiers of a forward converter. In the circuit, Q1 and Q2 are MOSFETs used as a synchronous rectifier. Cg_Q1 and Cg_Q2 represent the gate capacitances of MOSFETs Q1 and Q2, respectively. In the circuit, the duty cycle for Q1 is D and the duty cycle for Q2 is 1−D.

With the resonant gate drive circuit, the energy stored in the gate of Q1 and Q2 is recovered by the resonant gate drive circuit. In addition, the turn-on time and turn-off time of Q1 and Q2 are reduced, which reduces their conduction loss.

2.2 Operation

Figure 13:
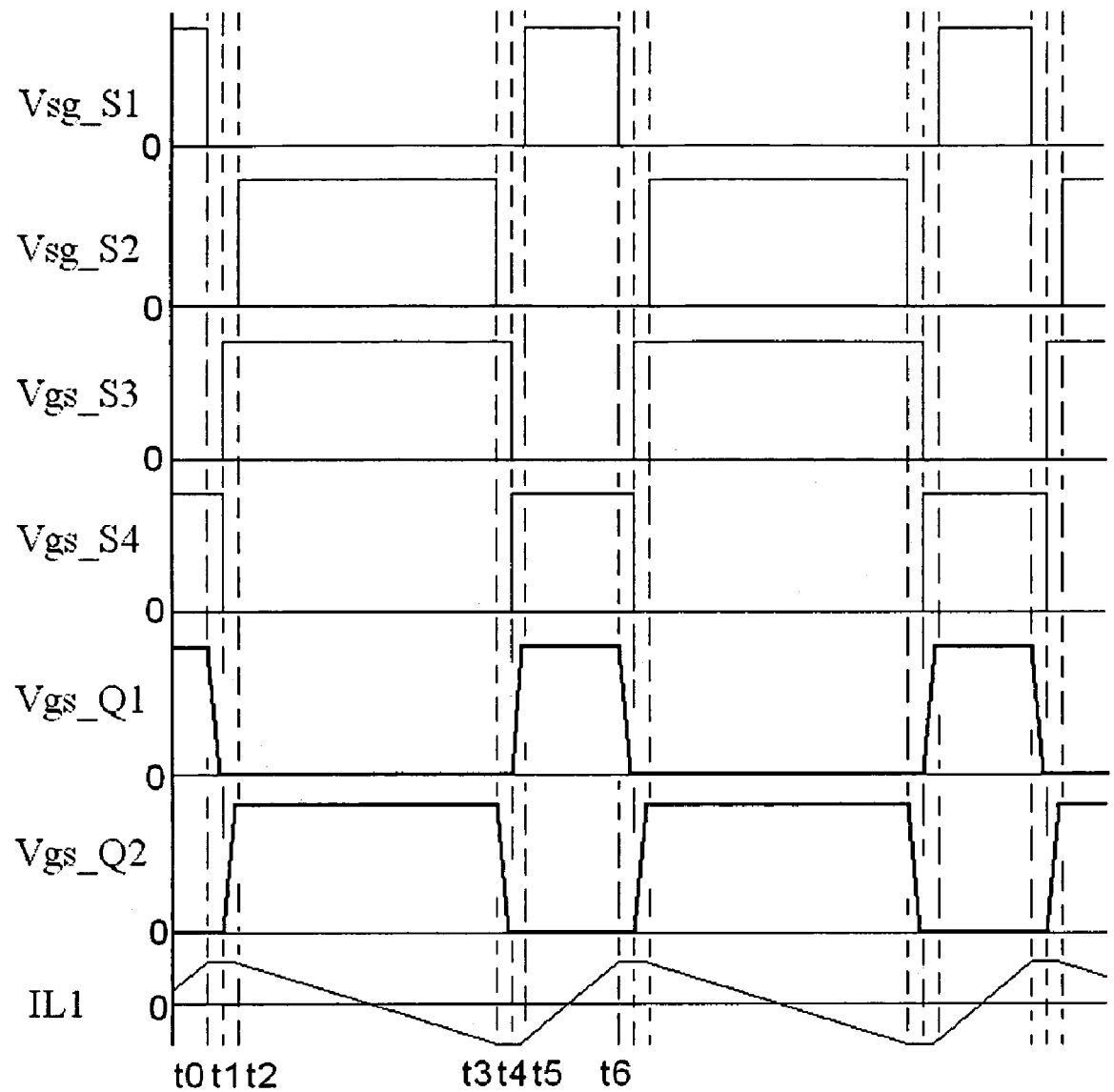
FIG. 13 shows the key waveforms of dual low-side complementary resonant gate drive circuit.

The operation of the dual low-side complementary resonant gate drive circuit, as shown in FIG. 11, can be analyzed by the key waveforms shown in FIG. 13. In the figure, Vsg_S1, Vsg_S2, Vgs_S3, and Vgs_S4 are gate drive signals for S1-S4. Vgs_Q1 and Vgs_Q2 are the voltages across Cg_Q1 and Cg_Q2. The rising edge and falling edge of Vgs_Q1 and Vgs_Q2 are shown to illustrate the details of the charging and discharging intervals. IL1 is the current waveform through inductor L1. In the analysis, it is assumed that capacitor C1 is very large and the voltage across C1 is a DC value. If the capacitor value C1 is small, the operation of the circuit does not change.

The following provides a detailed description of the operation of the dual low-side complementary resonant gate driver circuit. The duty cycle for Q1 is D and the duty cycle for Q2 is 1−D. Refer to the key waveforms in FIG. 13 and the circuit in FIG. 12.

Before t0:

S1, S4 are on and S2, S3 are off. Q1 is on and Q2 is off. Inductor current IL1 increases to the maximum value at t0.

From t0 to t1:

S1 is turned off at t0. Inductor L1 resonates with the gate capacitor of MOSFET Q1, Cg_Q1. Cg_Q1 is discharged during this period. The voltage across Cg_Q1 decreases and it is clamped to zero by the body diode of S3 before t1. Q1 is turned off in this time interval. At t1, S3 is turned on and S4 is turned off with zero voltage simultaneously. By controlling the turn-off instant for S1 (t0), the turn-off instant of Q1 can be controlled.

From t1 to t2:

S3 is turned on and S4 is turned off with zero voltage at t1 simultaneously. Inductor L1 resonates with the gate capacitor of MOSFET Q2, Cg_Q2. Cg_Q2 is charged during this period. The voltage across Cg_Q2 increases and it is clamped to the source voltage Vc by the body diode of S2 before t2. Q2 is turned on in this time interval. At t2, S2 is turned on with zero voltage. By controlling the turn-on instant for S3 (t1), the turn-on instant for Q2 can be controlled.

From t2 to t3:

S1, S4 are off and S2, S3 are on. Q1 is off and Q2 is on. The inductor current IL1 decreases to zero and then it increases in the opposite direction. It reaches negative maximum at t3. At t3, S2 is turned off with zero voltage.

From t3 to t4:

S2 is turned off at t3. Inductor L1 resonates with capacitor Cg_Q2. Cg_Q2 is discharged during this period. The voltage across Cg_Q2 decreases and it is clamped to zero by the body diode of S4 before t4. Q2 is turned off in this time interval. At t4, S3 is turned off and S4 is turned on with zero voltage simultaneously. By controlling the turn-off instant for S2 (t3), the turn-off instant of Q2 can be controlled.

From t4 to t5:

S3 is turned off and S4 is turned on with zero voltage at t4 simultaneously. Inductor L1 resonates with capacitor Cg_Q1. Cg_Q1 is charged during this period. The voltage across Cg_Q1 increases and it is clamped to the source voltage Vc by the body diode of S1 before t5. Q1 is turned on in this time interval. At t5, S1 is turned on with zero voltage. By controlling the turn-off instant for S3 (t4), the turn-on instant for Q1 can be controlled.

From t5 to t6:

S1, S4 are on and S2, S3 are off, while Q1 is on and Q2 is off. The negative inductor current IL1 rises through zero and further increases. The value of the inductor current IL1 increases to positive maximum at t6. The next cycle starts at t6.

3 Dual High-Side and Low-Side Resonant Gate Drive Circuit

This section discusses in detail the circuit topology and operation of a resonant gate drive circuit for dual low-side and high-side complementary or symmetrical MOSFET drive. For example, the circuit may be used to drive the control MOSFET and synchronous MOSFET of a buck converter. The circuit may be used to drive the high-side and low-side MOSFET in a half-bridge converter or a full-bridge converter. It may also be used for phase shift in a full bridge converter. The circuit may also be used for other power converters as will be evident to one skilled in the art.

3.1 Topology

Figure 14:
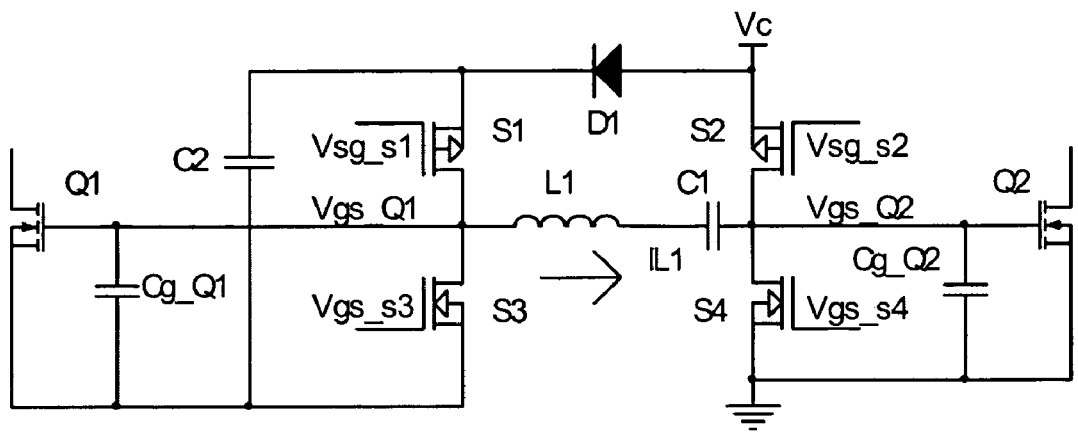
FIG. 14 is a schematic diagram of a dual high-side and low-side complementary resonant gate drive circuit.

A resonant gate drive circuit for dual high-side and low-side complementary MOSFET drive is shown in FIG. 14. The circuit consists of four switches, S1-S4, one inductor, L1, two capacitors, C1 and C2, and one diode, D1. Capacitor C1 is used to block the DC current flow through inductor L1. Capacitor C2 is a flying capacitor that is used for high-side drive. Diode D1 is used to charge the capacitor C2 to a voltage above the supply voltage Vc. Gate capacitors Cg_Q1 and Cg_Q2 are the load of the resonant gate drive. It is noted that one end of Cg_Q2 is connected to ground. However, neither end of Cg_Q1 is connected to ground. This capacitor is floating. This is required for high-side drive. To simplify the implementation, P-channel MOSFETs are used for S1 and S2 and N-channel MOSFETs are used for S3 and S4. It is noted that other implementations may also be used to achieve the same effect.

The resonant gate drive circuit shown in FIG. 14 charges and discharges the gate capacitors Cg_Q1 and Cg_Q2 with minimum energy loss and as quickly as possible. When the gate capacitor voltage is high, the MOSFET is turned on, and when the gate capacitor voltage is low, the MOSFET is turned off.

Figure 15:
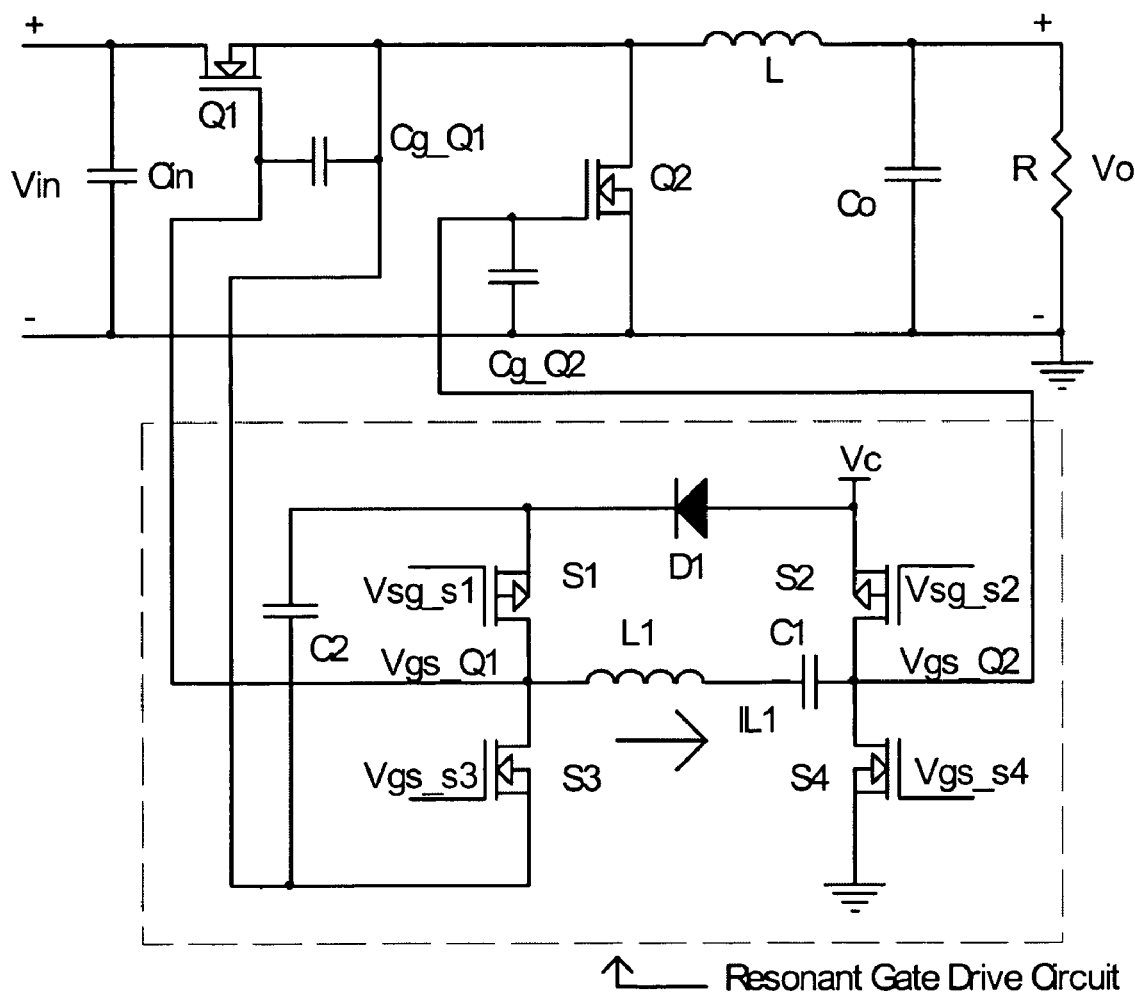
FIG. 15 is a schematic diagram of a buck converter with a dual high-side and low-side complementary resonant gate drive circuit.

FIG. 15 shows a dual high-side and low-side resonant gate drive circuit used to drive the two MOSFETs in a buck converter. In the circuit, Q1 is the control MOSFET and Q2 is the synchronous drive MOSFET. Cg_Q1 and Cg_Q2 are gate capacitors for Q1 and Q2, respectively. The duty cycle for Q1 is D and the duty cycle for Q2 is 1−D.

With the resonant gate drive circuit, the energy stored in the gate of Q1 and Q2 is recovered. In addition, the turn-on and turn-off time of Q1 and Q2 are reduced as compared with a conventional gate drive circuit. One benefit is lower switching loss for Q1 and lower conduction loss for Q2. The efficiency of the buck converter is therefore improved.

Figure 16:
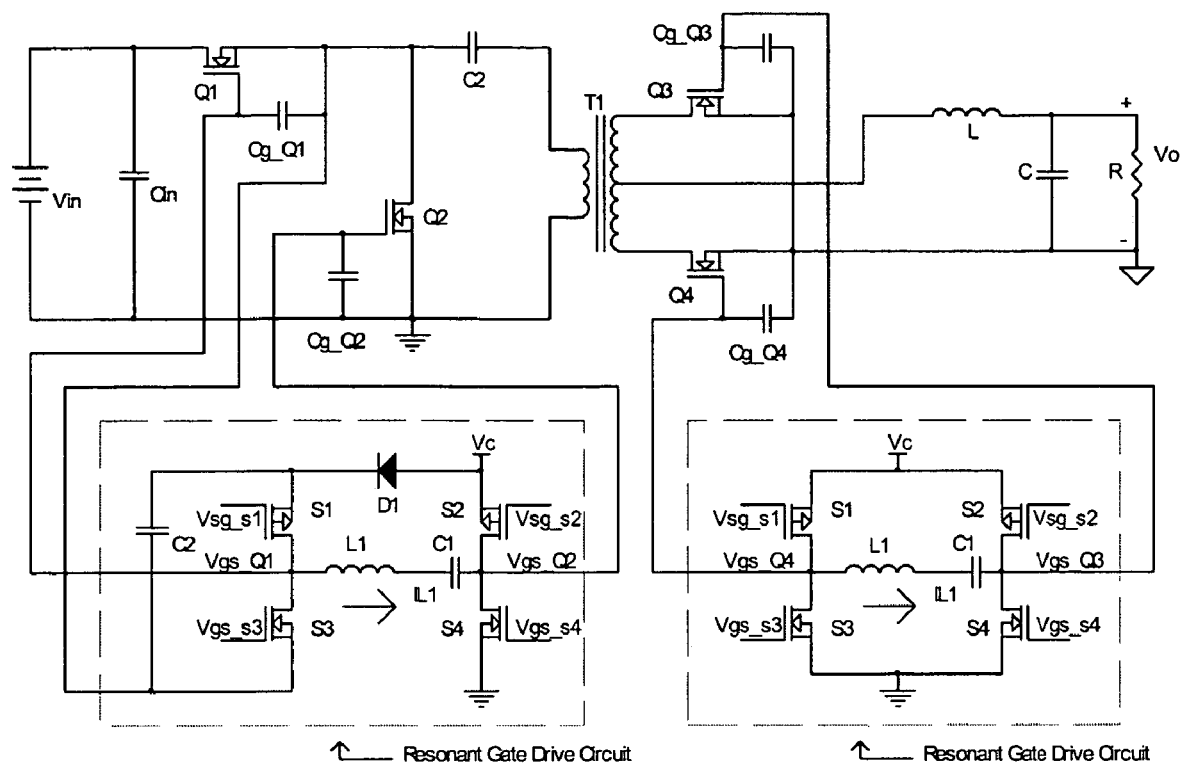
FIG. 16 is a schematic diagram of an asymmetrical half bridge converter with a dual high-side and low-side complementary resonant gate drive circuit and a dual low-side complementary resonant gate drive circuit.

The dual high-side and low-side resonant gate drive circuit shown in FIG. 14 may also be used in other circuit topologies. For example, FIG. 16 shows an asymmetrical half bridge converter with dual resonant gate drive circuits. At the primary side, a dual high-side and low-side complementary resonant gate drive circuit is used, and at the secondary side, a dual low-side complementary resonant gate drive circuit is used.

Figure 17:
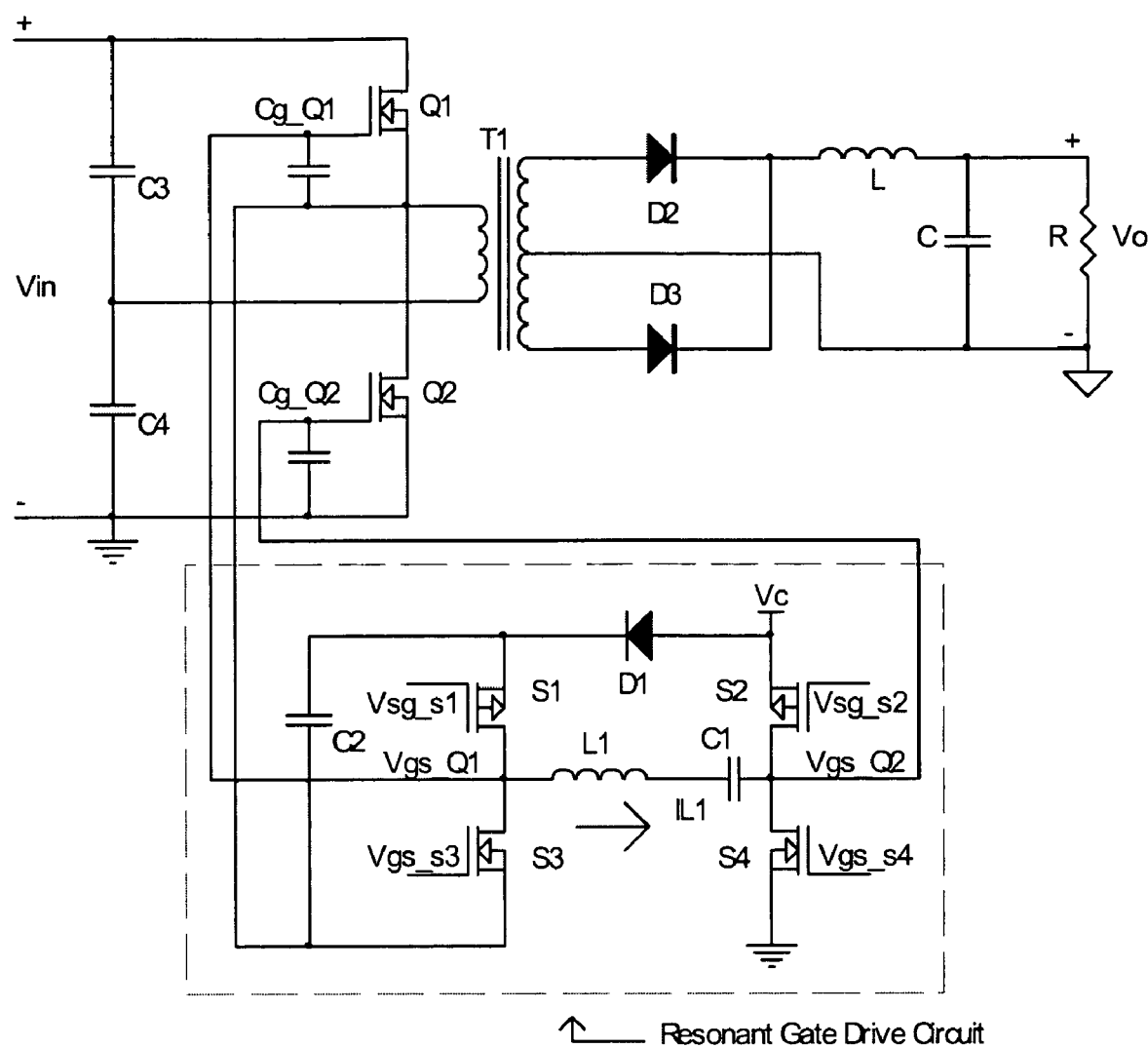
FIG. 17 is a schematic diagram of a half bridge converter with a dual high-side and low-side resonant gate drive circuit.
Figure 19:
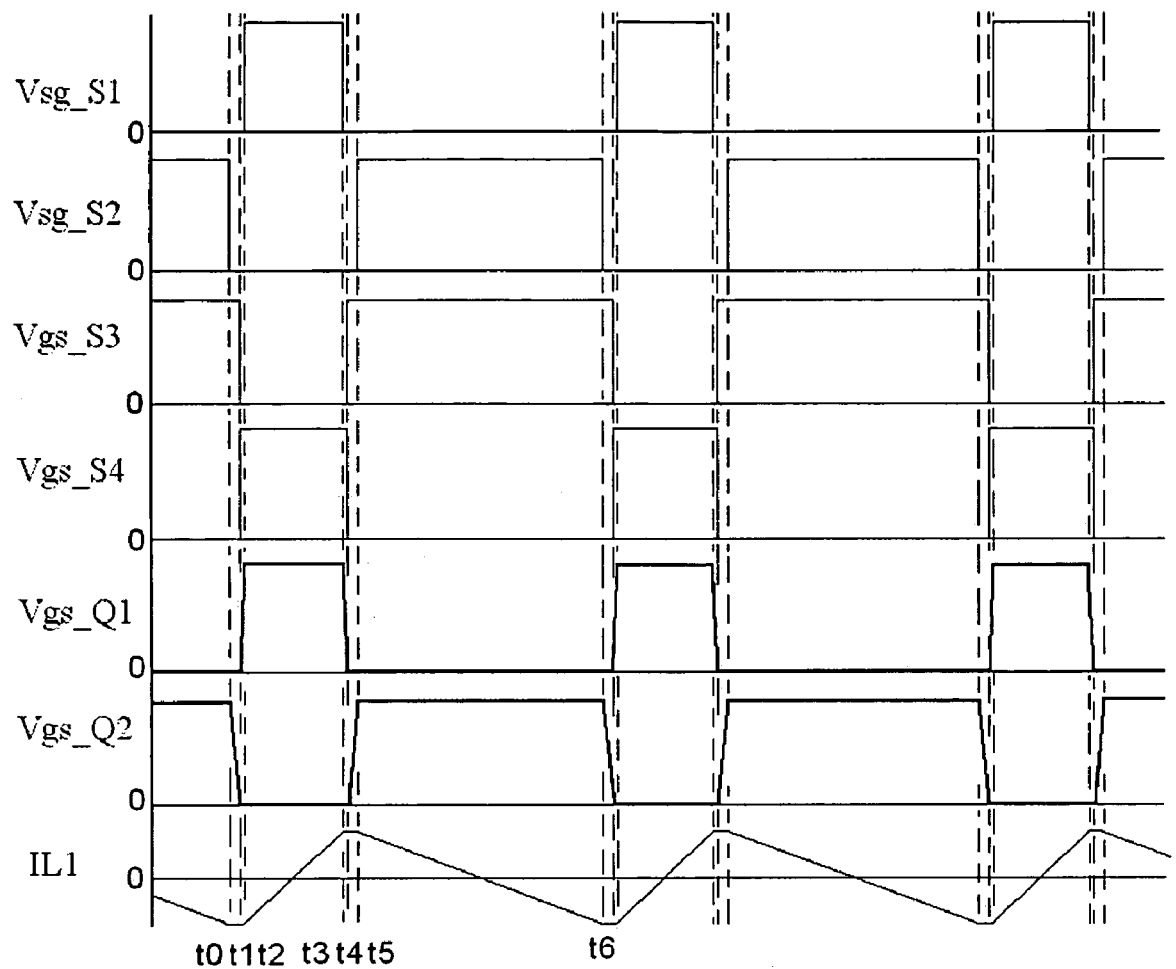
FIG. 19 shows the key waveforms of a dual high-side and low-side resonant gate drive circuit with complementary signal operation.

In FIG. 15 and FIG. 16, the dual high-side and low-side resonant gate drive circuit generates a complementary gate signal. It generates D for Q1 and 1−D for Q2. The waveforms are shown in FIG. 19. It is noted that this circuit can also generate a symmetrical duty cycle for Q1 and Q2. FIG. 17 shows a half-bridge converter with a dual high-side and low-side resonant gate drive circuit.

Figure 20:
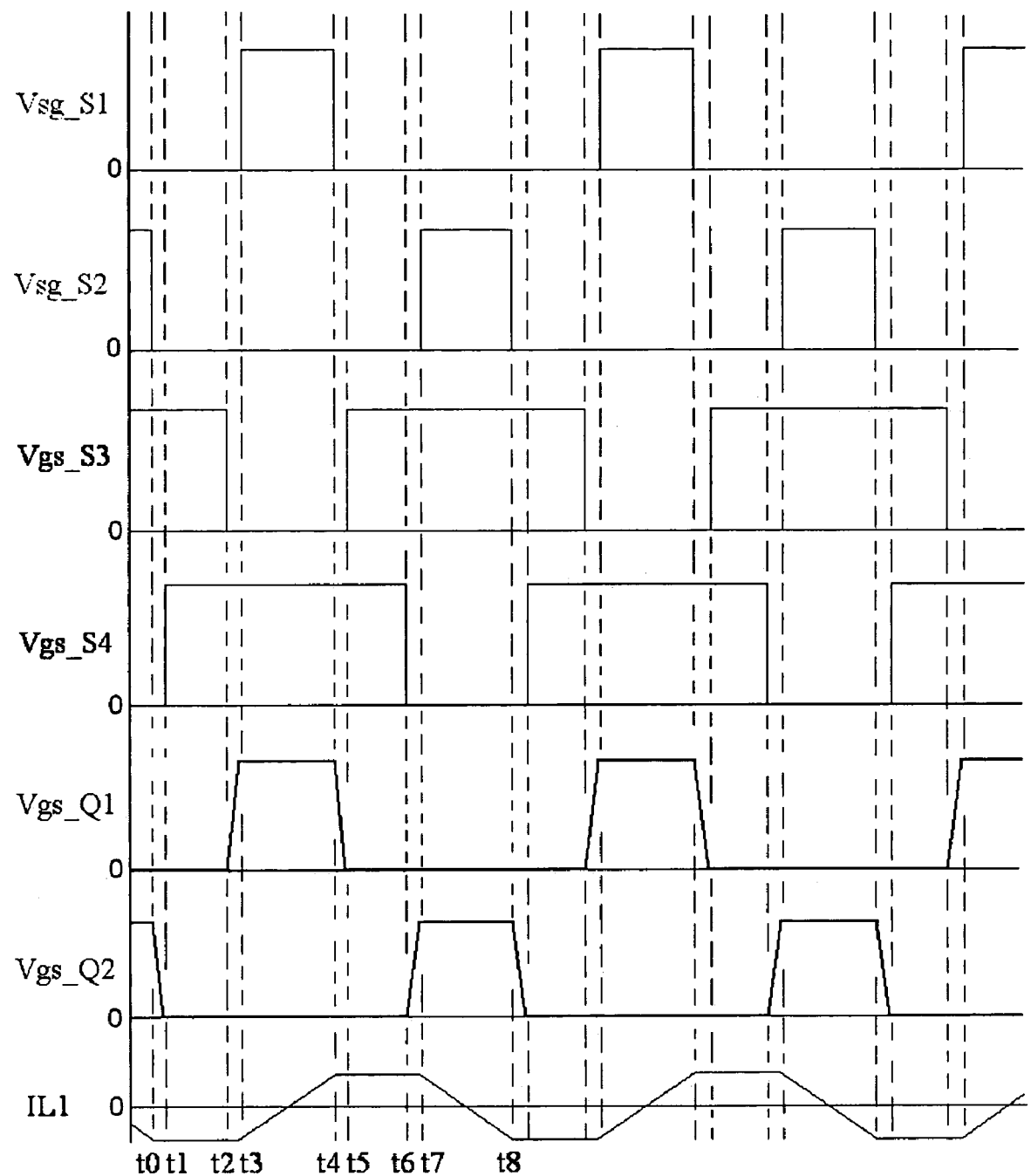
FIG. 20 shows the key waveforms of a dual high-side and low-side resonant gate drive circuit with symmetrical signal operation.

In FIG. 17, Cg_Q1 and Cg_Q2 represent the gate capacitors of MOSFETs Q1 and Q2, respectively. The duty cycles for Q1 and Q2 are both D. The waveforms are shown in FIG. 20.

Figure 18:
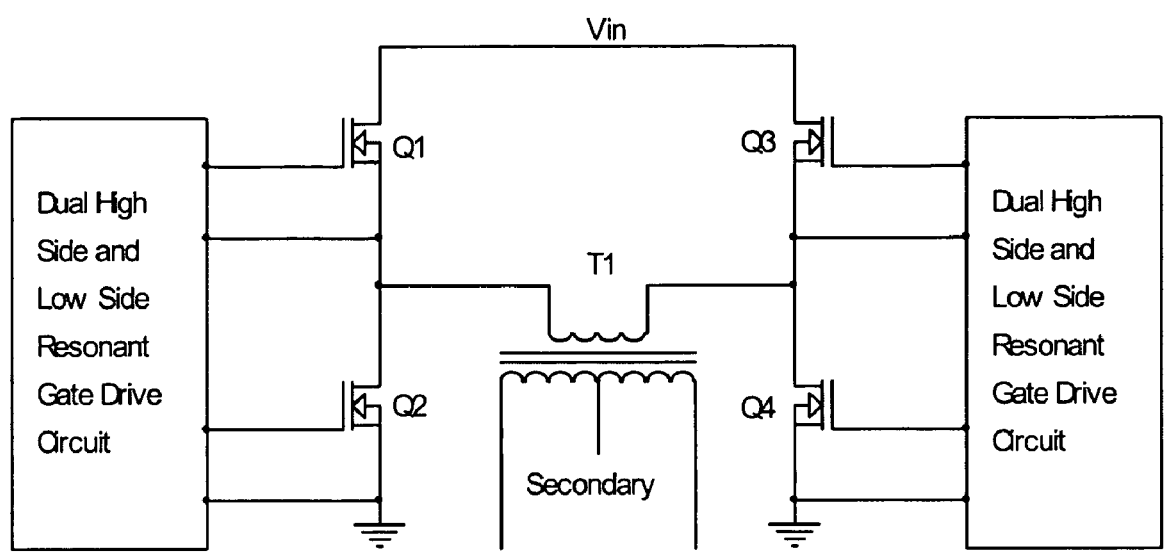
FIG. 18 is a block diagram of a full bridge converter with a dual high-side and low-side resonant gate drive circuit.

FIG. 18 shows a full-bridge converter with dual high-side and low-side symmetrical resonant gate drive circuits. In the circuit, two dual high-side and low-side resonant gate drive circuits are used, one for the left side and one for the right side. Cg_Q1, Cg_Q2, Cg_Q3, and Cg_Q4, not shown, are the gate capacitances of Q1, Q2, Q3, and Q4, respectively.

3.2 Operation for Complementary Gate Drive Signal

The resonant gate drive circuit shown in FIG. 14 may operate in both complementary and symmetrical mode. Operation of the circuit in complementary gate drive mode is discussed in this section and operation of the circuit in symmetrical gate drive mode is discussed in section 3.3.

Operation of a dual high-side and low-side complementary resonant gate drive circuit, as shown in FIG. 14, can be analyzed by the key waveforms shown in FIG. 19. In FIG. 19, Vsg_S1, Vsg_S2, Vgs_S3, and Vgs_S4 are gate drive signals for S1-S4. Vgs_Q1 and Vgs_Q2 are the voltages across Cg_Q1 and Cg_Q2. The rising edge and falling edge of Vgs_Q1 and Vgs_Q2 are shown to illustrate the details of the charging and discharging intervals. IL1 is the current waveform through inductor L1. In the analysis, it is assumed that capacitor C1 is very large and the voltage across C1 is a DC value. If the capacitor value C1 is small, operation of the circuit does not change. The capacitor value for C2 is very large and the voltage across C2 is a DC value.

The following provides a detailed description of the operation of a dual high-side and low-side resonant gate driver circuit operating in complementary mode. The duty cycle for Q1 is D and duty cycle for Q2 is 1−D. Refer to the key waveforms in FIG. 19 and the circuit of FIG. 14.

Before t0:

S1, S4 are off and S2, S3 are on. Q1 is off and Q2 is on. The inductor current, IL1, increases to negative maximum value. The inductor current IL1 flows in the loop consisting of S2, C1, L1, S3, Q2 and Vc. The voltage across C2 is charged to the level of Vc via D1 and Q2.

From t0 to t1:

S2 is turned off at t0. Inductor L1 resonates with the gate capacitor of MOSFET Q2, Cg_Q2. Cg_Q2 is discharged during this period. The voltage across Cg_Q2 decreases and it is clamped to zero by the body diode of S4 before t1. Q2 is turned off in this time interval. The current IL1 flows in the loop consisting of Cg_Q2, C1, L1, S3 and Q2. Then at t1, S3 is turned off and S4 is turned on with zero voltage simultaneously. By controlling the turn-off instant for S2 (t0), the turn-off instant of Q2 can be controlled.

From t1 to t2:

S3 is turned off and S4 is turned on with zero voltage at t1 simultaneously. Inductor L1 resonates with the gate capacitor of MOSFET Q1, Cg_Q1. Cg_Q1 is charged during this period. The voltage across Cg_Q1 increases and it is clamped to the level of Vc by the body diode of S1 before t2. Q1 is turned on in this time interval. The current IL1 flows in the loop consisting of S4, C1, L1, Cg_Q1, Q1, and Vc after Q1 is turned on. Then at t2, S1 is turned on with zero voltage. By controlling the turn-off instant for S3 (t1), the turn-on instant for Q1 can be controlled.

From t2 to t3:

S1, S4 are on and S2, S3 are off. Q1 is on and Q2 is off. The negative inductor current IL1 rises to zero and further increases. The value of the current IL1 increases to positive maximum at t3. The current IL1 flows in the loop consisting of C2, S1, L1, C1, S4, Vc, and Q1. Then at t3, S1 is turned off with zero voltage.

From t3 to t4:

S1 is turned off at t3. Inductor L1 resonates with capacitor Cg_Q1. Cg_Q1 is discharged during this period. The voltage across Cg_Q1 decreases and it is clamped to zero by the body diode of S3 before t4. Q1 is turned off in this time interval. The current IL1 flows in the loop consisting of Cg_Q1, L1, C1, S4, Vc, and Q1. At t4, S3 is turned on and S4 is turned off with zero voltage simultaneously. By controlling the turn-off instant for S1 (t3), the turn-off instant of Q1 can be controlled.

From t4 to t5:

S3 is turned on and S4 is turned off with zero voltage at t4 simultaneously. Inductor L1 resonates with capacitor Cg_Q2. Cg_Q2 is charged during this period. The voltage across Cg_Q2 increases and it is clamped to the source voltage Vc by the body diode of S2 before t5. Q2 is turned on in this time interval. The current IL1 flows in the loop consisting of S3, L1, C1, Cg_Q2, and Q2. At t5, S2 is turned on with zero voltage. By controlling the turn-on instant for S3 (t4), the turn-on instant for Q2 can be controlled.

From t5 to t6:

S1, S4 are off and S2, S3 are on, while Q1 is off and Q2 is on. The inductor current IL1 decreases to zero and then it increases in the opposite direction. The value of the current IL1 increases to negative maximum at t6. The current IL1 flows in the loop consisting of S2, C1, L1, S3, Q2 and Vc. The next cycle starts at t6.

3.3 Operation for Symmetrical Gate Drive Signal

As discussed earlier, the dual high-side and low-side resonant gate drive circuit shown in FIG. 14 may also operate in symmetrical duty cycle mode. Converters such as half bridge converters and full bridge converters require this operation mode.

The symmetrical signal operation can be analyzed by the key waveforms shown in FIG. 20. In the figure, Vsg_S1, Vsg_S2, Vgs_S3, and Vgs_S4 are gate drive signals for S1-S4. Vgs_Q1 and Vgs_Q2 are the voltages across Cg_Q1 and Cg_Q2. The rising edge and falling edge of Vgs_Q1 and Vgs_Q2 are shown to illustrate the details of the charging and discharging intervals. IL1 is the current waveform through inductor L1. In the analysis, it is assumed that capacitor C1 is very large and the voltage across C1 is a DC value. If the capacitor value C1 is small, the operation of the circuit does not change. The capacitor value for C2 is very large and the voltage across C2 is a DC value.

The following provides a detailed description of the operation of a dual high-side and low-side resonant gate driver circuit operating at symmetrical mode. The duty cycles for Q1 and Q2 are both D, with half switching period shift between each other. Refer to the key waveforms in FIG. 20 and the circuit in FIG. 14.

Before t0:

S2, S3 are on and S1, S4 are off. Q1 is off and Q2 is on. The inductor current reaches negative maximum at t0. The inductor current, IL1, flows through S2, C1, L1, S3, Q2, and Vc. The voltage across C2 is charged to the level of Vc via D1 and Q2.

From t0 to t1:

S2 is turned off at t0 with zero voltage. Inductor L1 resonates with the gate capacitor of Q2, Cg_Q2. Cg_Q2 is discharged during this period. The voltage across Cg_Q2 decreases and it is clamped to zero by the body diode of S4 before t1. Q2 is turned off in this time interval. The current IL1 flows through Cg_Q2, C1, L1, S3, and Q2. At t1, S4 is turned on with zero voltage. By controlling the turn-off instant for S2 (t0), the turn-off instant for Q2 can be controlled.

From t1 to t2:

S3, S4 are on and S1, S2 are off. Both Q1 and Q2 are off. The inductor current IL1 remains constant in this interval. The current IL1 flows through S4, C1, L1, S3, the primary winding of the transformer, C3, C4, and Vc.

From t2 to t3:

S3 is turned off at t2 with zero voltage. Inductor L1 resonates with the gate capacitor of Q1, Cg_Q1. Cg_Q1 is charged during this period. The voltage across Cg_Q1 increases and it is clamped to the level of Vc by the body diode of S1 before t3. Q1 is turned on in this time interval. The current IL1 flows through S4, C1, L1, Cg_Q1, Q1, and Vc after Q1 is turned on. At t3, S1 is turned on with zero voltage. By controlling the turn-off instant for S3 (t2), the turn-on instant for Q1 can be controlled.

From t3 to t4:

S1, S4 are on and S2, S3 are off. Q1 is on and Q2 is off. The inductor current increases from the negative maximum, through zero and reaches a positive maximum at t4. The current IL1 flows through S4, C1, L1, S1, C2, Q1, and Vc.

From t4 to t5:

S1 is turned off at t4 with zero voltage. Inductor L1 resonates with Cg_Q1. Cg_Q1 is discharged during this period. The voltage across Cg_Q1 decreases and it is clamped to zero by the body diode of S3 before t5. Q1 is turned off in this time interval. The current IL1 flows through Cg_Q1, L1, C1, S4, the primary winding of the transformer, C3, C4, and Vc after Q1 is turned off. At t5, S3 is turned on with zero voltage. By controlling the turn-off instant for S1 (t4), the turn-off instant of Q1 can be controlled.

From t5 to t6:

S3, S4 are on and S1, S2 are off. Both Q1 and Q2 are off. The inductor current IL1 is constant in this interval. The current IL1 flows through S3, L1, C1, S4, Vc, C3, C4, and the primary winding of the transformer.

From t6 to t7:

S4 is turned off at t6 with zero voltage. Inductor L1 resonates with Cg_Q2. Cg_Q2 is charged during this period. The voltage across Cg_Q2 increases and it is clamped to the source voltage Vc by the body diode of S2 before t7. Q2 is turned on in this time interval. The current IL1 flows through S3, L1, C1, Cg_Q2, and Q2 after Q2 is turned on. Then at t7, S2 is turned on with zero voltage. By controlling the turn-off instant for S4 (t6), the turn-on instant of Q2 can be controlled.

From t7 to t8:

S2, S3 are on and S1, S4 are off. Q1 is off and Q2 is on. The inductor current IL1 decreases to zero and it increases to a negative maximum at t8. The current IL1 flows through S2, C1, L1, S3, Q2, and Vc. The next cycle starts at t8.

4. Single High-side or Low-side Resonant Gate Drive Circuit

This section discusses in detail the circuit topology and operation of a resonant gate drive circuit for single high-side or low-side MOSFET gate drive, such as that shown in the general block diagram of FIG. 3. The circuit achieves quick turn-on and turn-off transition times to reduce switching loss and conduction loss in power MOSFETS using turn-on and turn-off pre-charge intervals. The driver returns energy to the line during intervals after the MOSFET is turned-on and after it is turned-off. The circuit may be used to drive, for example, the control MOSFET or the synchronous MOSFET of a buck converter. The circuit may be used to drive the high-side or the low-side MOSFET in a half bridge converter or a full bridge converter. It may also be used for phase shift in a full bridge converter. The circuit may also be used for other power converters as will be evident to one skilled in the art.

4.1 Topology

Figure 21:
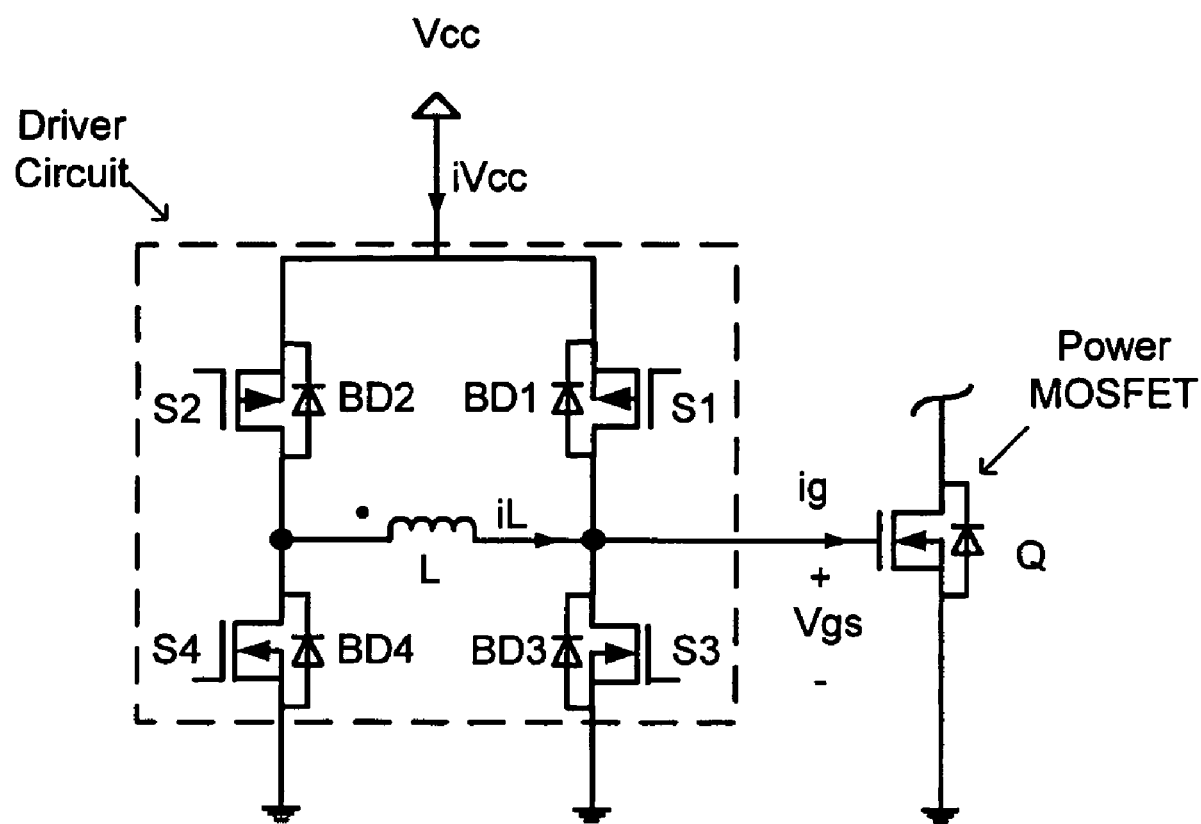
FIG. 21 is a schematic diagram of a resonant gate driver adapted for driving a single power switching device.

Referring to FIG. 21, the circuit consists of four control switches S1-S4 and a small resonant inductance L. BD1 to BD4 are the body diodes of switches S1-S4. The power switch Q is the switch to be driven. The gate capacitance of the power switch Q is not shown. The current iL through the resonant inductance L is discontinuous to minimize circulating current conduction loss. The four control switches switch with near zero switching loss. The switches S1, S3 closest to the power switch Q turn on with zero voltage switching and turn off in a lossless manner since they are shunted by the power switch gate capacitance. The switches S2, S4 farthest from the power switch Q have both zero voltage and zero current transitions. The peak inductor current and gate current are controlled, so they are independent of duty cycle, or switching frequency. P-channel MOSFETs are shown for control switches S1 and S2 due to the simple driving requirements; however they may be replaced by N-channel MOSFETs. In such case their gating waveforms would be complementary.

4.2 Operation

Operation of the circuit shown in FIG. 21 will now be explained with reference to the waveforms shown in FIG. 22(a). In order from top to bottom, the waveforms represent: 1) the control switch S1 gating waveform, 2) the control switch S2 gating waveform, 3) the control switch S3 gating waveform, 4) the control switch S4 gating waveform, 5) the inductor current, 6) the power MOSFET gate current, 7) the power MOSFET gate-to-source driving voltage, and 7) the line current from the control voltage source.

The power MOSFET gate terminal is modeled as a capacitance, Cg. Initially it is assumed that the power MOSFET is in the off state before time t0. For the control switches, the shaded regions in FIG. 22(a) indicate the on-state, so initially only switches S3 and S4 are on and the gate of Q is clamped to zero volts. In all cases, a small dead-time (not shown) is added between the complementary transitions of S2 and S4 to eliminate shoot-through and allow zero voltage switching (ZVS) or zero current switching (ZCS).

From t0 to t1:

Initially, before time t0, S3 and S4 are on, the inductor current is zero, and the power MOSFET gate is clamped low. At time t0, S4 turns off (with ZCS) and then S2 turns on (with ZCS) allowing the inductor current to ramp up. The current path during this interval is S2-L-S3. Since S3 is in the on state, the gate of Q is clamped low. The interval ends at time t1.

From t1 to t2:

At time t1, S3 turns off (with approximate ZVS due to large shunt power MOSFET gate capacitance), which allows the inductor current to begin to charge the power MOSFET gate. Since the dotted side of the inductor is clamped to the line and the other side is connected to the gate capacitance of Q, the inductor current continues to ramp up, but with a reduced slope as the voltage across the gate capacitance increases. The current path during this interval is S2-L-Cg. This interval ends at time t2, when Vgs reaches Vcc. If this interval is allowed to continue, the body diode BD1 of switch S1 allows the current to freewheel through S2-L-BD1.

From t2 to t3:

At time t2, S2 turns off and S1 and then S4 turn on (both with ZVS), allowing the inductor current to conduct into the dot through the path S4-L-S1. Importantly, it is during this interval that the gate charging energy is returned to the line. This can be observed from the negative portion of the iVcc curve in FIG. 22(a). Also, during this interval, the inductor voltage becomes reverse biased, so the inductor current quickly ramps down towards zero. During this interval, the gate voltage of Q remains clamped to the line voltage, Vcc. The interval ends when the inductor current reaches zero at time t3.

From t3 to t4:

At time t3, S4 turns off (with ZCS) and then S2 turns on (with ZCS), which allows any residual inductor current to freewheel through S2-L-S1. During this interval, the gate voltage of Q remains clamped to Vcc. The interval ends at time t4 when the pre-charging interval for the turn-off cycle begins as dictated by the PWM signal from the controller.

From t4 to t5:

At time t4, the turn-off pre-charging interval begins. S2 turns off (with ZCS) and S4 turns on (with ZCS). Since S1 was previously on, the inductor current begins to ramp negative out of the dot through the path S1-L-S4. During this interval, the gate voltage of Q remains clamped to Vcc. The interval ends at time t5.

From t5 to t6:

At time t5, S1 turns off (with shunted ZVS from Q), which allows the inductor current to begin to discharge the power MOSFET gate. Since the dotted side of the inductor is clamped to ground and the other side is connected to the gate capacitance of Q, the inductor current continues to ramp negative, but with a reduced slope as the voltage across the gate capacitance decreases. The current path during this interval is Cg-L-S4. This interval ends at time t6, when Vgs reaches zero. If this interval is allowed to continue, the body diode of switch S3 will allow the current to freewheel through BD3-L-S4.

From t6 to t7:

At time t6, S4 turns off and S2 and S3 turn on (both with ZVS), allowing the inductor current to conduct out of the dot through the path S3-L-S2. Importantly, it is also during this interval that the gate discharging energy is returned to the line. This can be observed from the negative portion of the iVcc curve in FIG. 22(a). Also, during this interval, the inductor voltage has become reverse biased, so the inductor current quickly ramps down positive towards zero. During this interval, the gate voltage of Q remains clamped to ground. The interval ends when the inductor current reaches zero at time t7.

From t7 to t0:

At time t7, S2 turns off (with ZCS) and S4 turns on (with ZCS), which allows any residual inductor current to freewheel through S3-L-S4. During this interval, the gate voltage of Q remains clamped to ground. The interval ends at time t0 when the pre-charging interval for the turn-on cycle begins and the entire process repeats as dictated by the PWM signal from the controller.

It can be observed from the operating intervals and the line current iVcc that energy is taken from the line voltage Vcc during three intervals, t0-t1, t1-t2 and t4-t5 and energy is returned to the line during two intervals, t2-t3 and t6-t7.

4.3 Reduced Pulse Embodiments

Figure 22A:
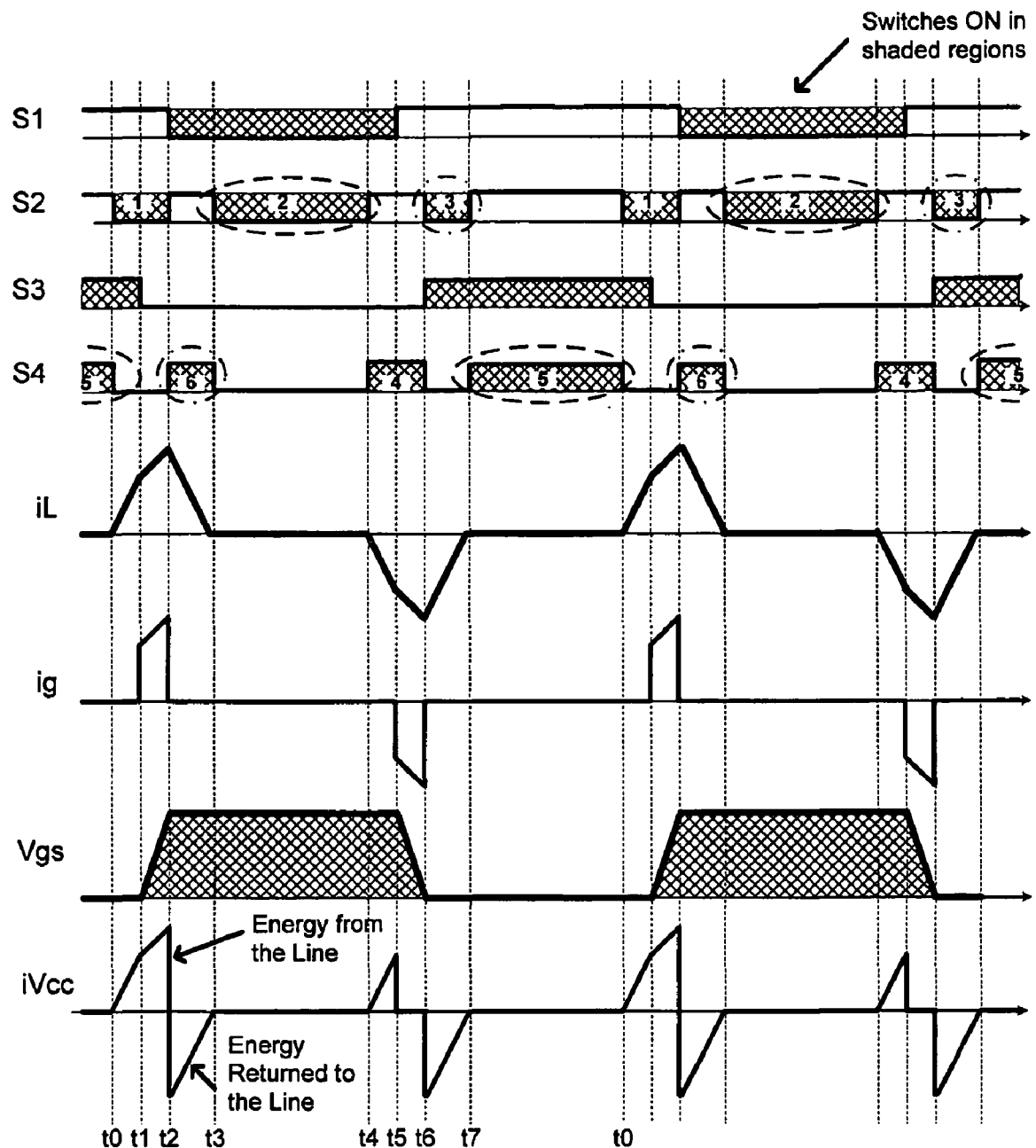
FIG. 22(a) is a plot showing key waveforms of the resonant gate driver of FIG. 21.

From FIG. 22(a) it can be seen that the gating signals for control switches S2 and S4 contain three pulses per switching period. In addition, the current through the control switches during the intervals labelled 2 (t3-t4), 3 (t6-t7), 5 (t7-t0) and 6 (t2-t3) is in the same direction as the body diode. In these cases, it is not required that the control switches be turned on. If left off, gate loss in the control switches can be saved.

There are two pulses for S2 and two for S4 that can be eliminated by using the body diodes, which provides three alternative embodiments of this resonant gate driver. The pulses that can be eliminated by using the body diodes, or external diodes, are labelled 2 and 3 for S2, and 5 and 6 for S4.

Reduced Pulse Embodiment 1 (2-Pulse)

Figure 22B:
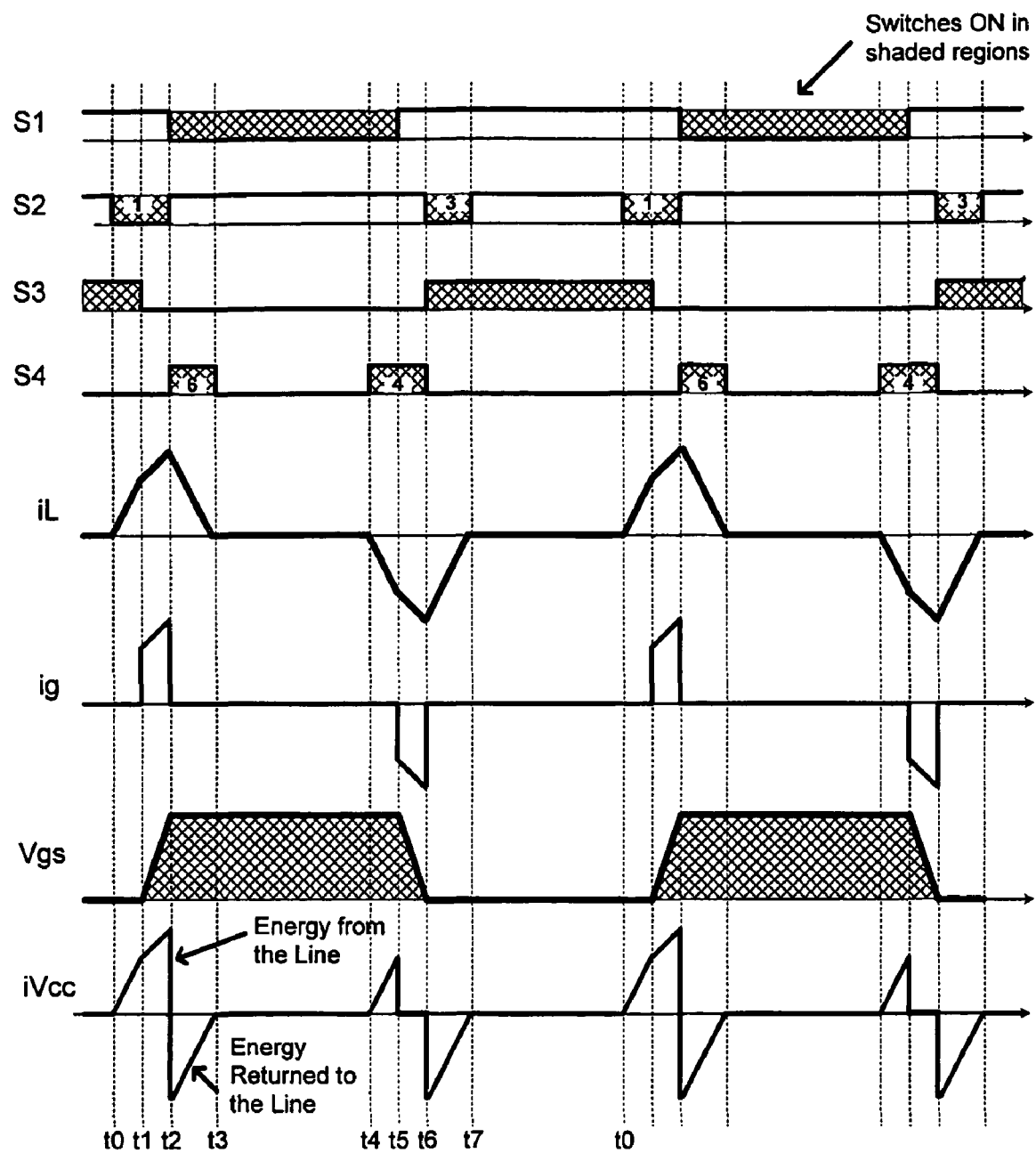
FIGS. 22(b)-(d) are plots showing reduced pulse embodiments of FIG. 22(a)

If pulse 2 is eliminated from S2 and pulse 5 is eliminated from S4 in FIG. 22(a), energy can be saved for these switches in the form of gate loss and output loss ($CV^2$) at turn-on. The body diodes (or external diodes) can be used to clamp the voltage across the inductor, allowing negligible current to circulate in the driver. In this case during the clamping interval t3-t4, switch S1 is on along with the body diode of S2. During the other clamping interval t7-t0, switch S3 is on along with the body diode of S4. Waveforms of this embodiment are shown in FIG. 22(b).

Reduced Pulse Embodiment 2 (2-Pulse)

Figure 22C:
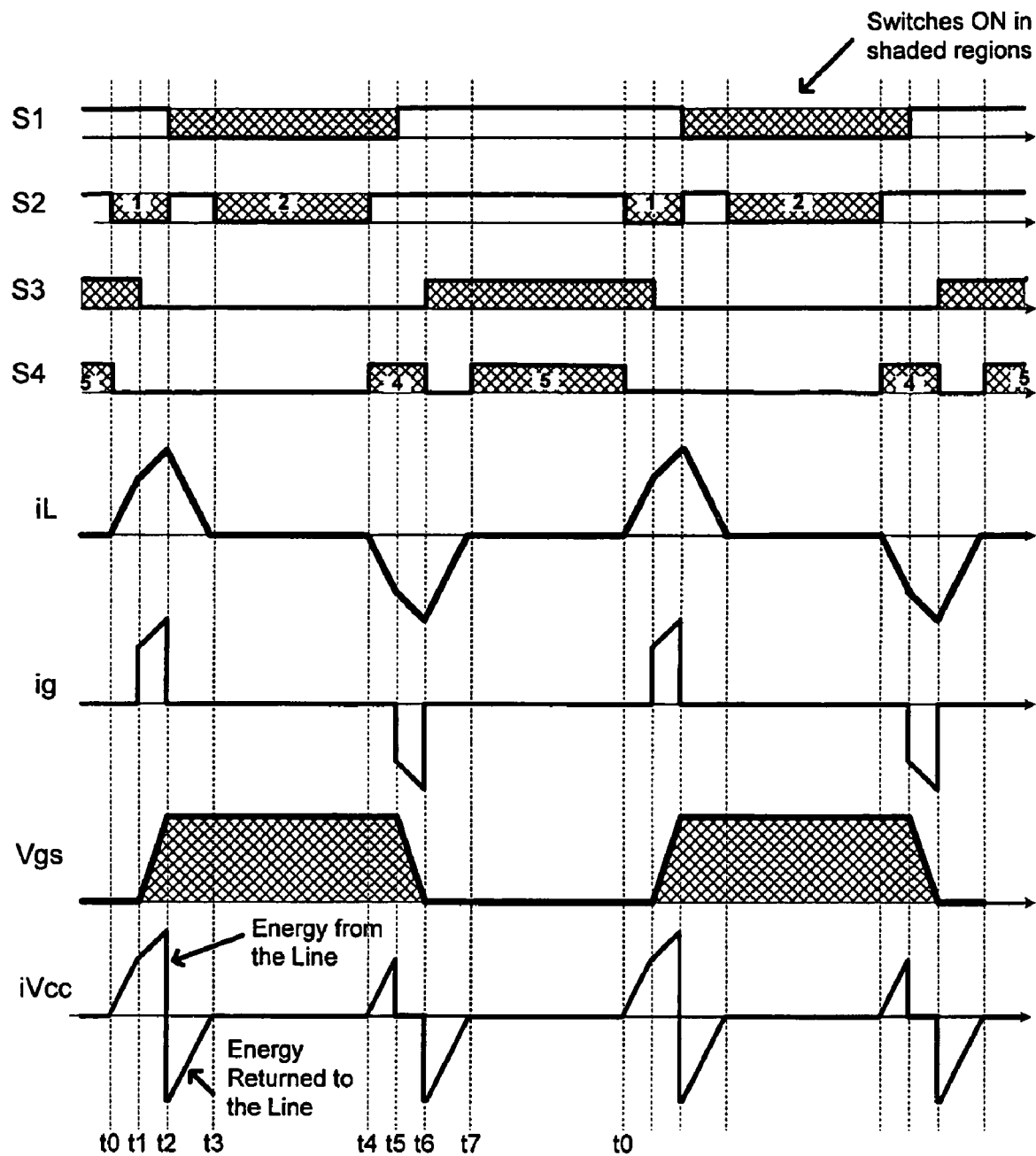

If pulse 3 is eliminated from S2 and pulse 6 is eliminated from S4 in FIG. 22(a), energy can be saved for these switches in the form of gate loss. The body diodes (or external diodes) can be used to provide the current paths when the energy is returned to the line. In this case during the energy return interval t2-t3, switch S1 is on along with the body diode of S4. During the other energy return interval t6-t7, switch S3 is on along with the body diode of S2. Waveforms of this embodiment are shown in FIG. 22(c)

Reduced Pulse Embodiment 3 (1-Pulse)

Figure 22D:
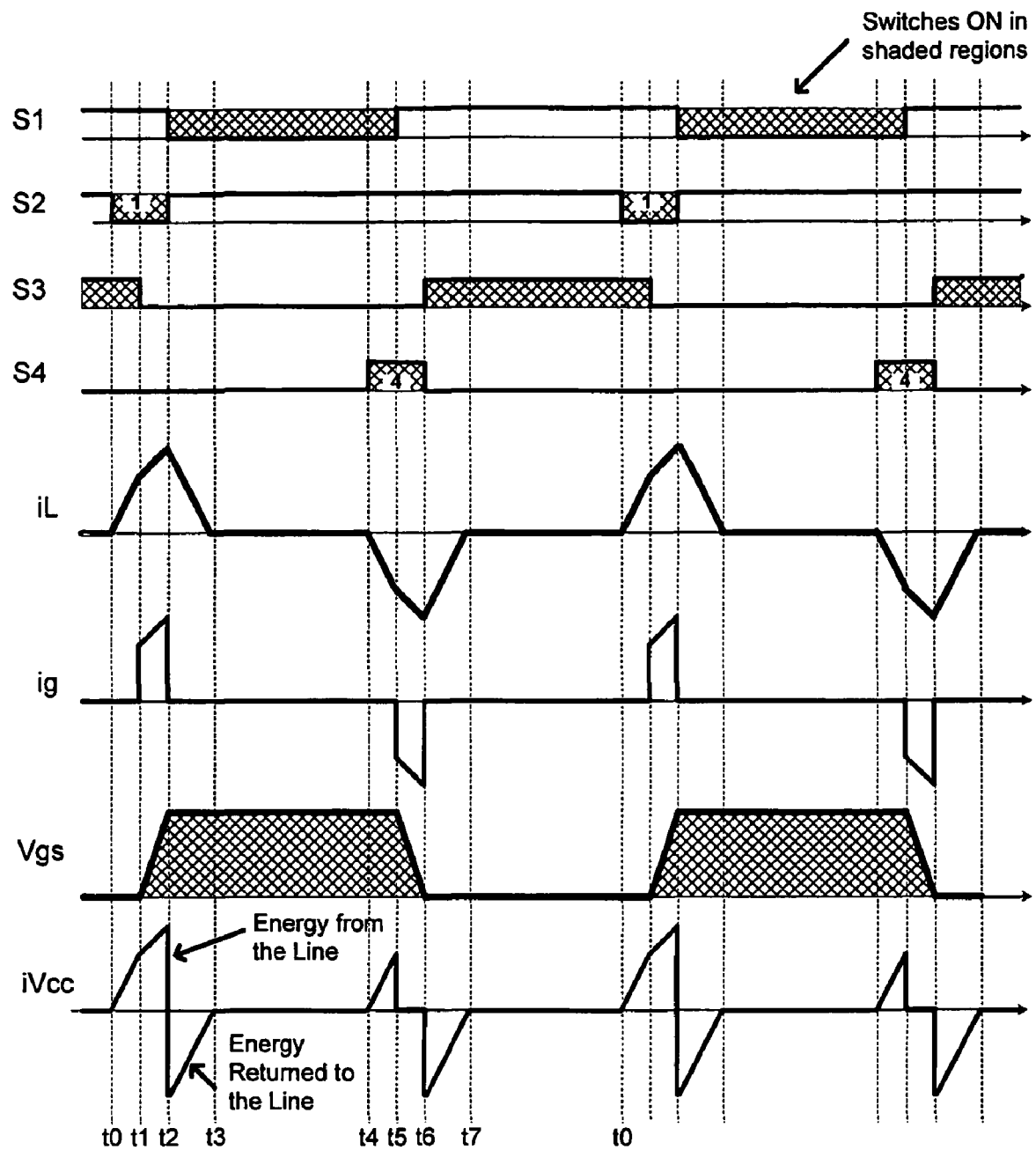

The above two alternative embodiments may be combined by eliminating pulses 2 and 3 from S2, and pulses 5 and 6 from S4, in FIG. 22(a). Waveforms of this embodiment are shown in FIG. 22(d).

4.4 High-Side Drive Implementation

Figure 23:
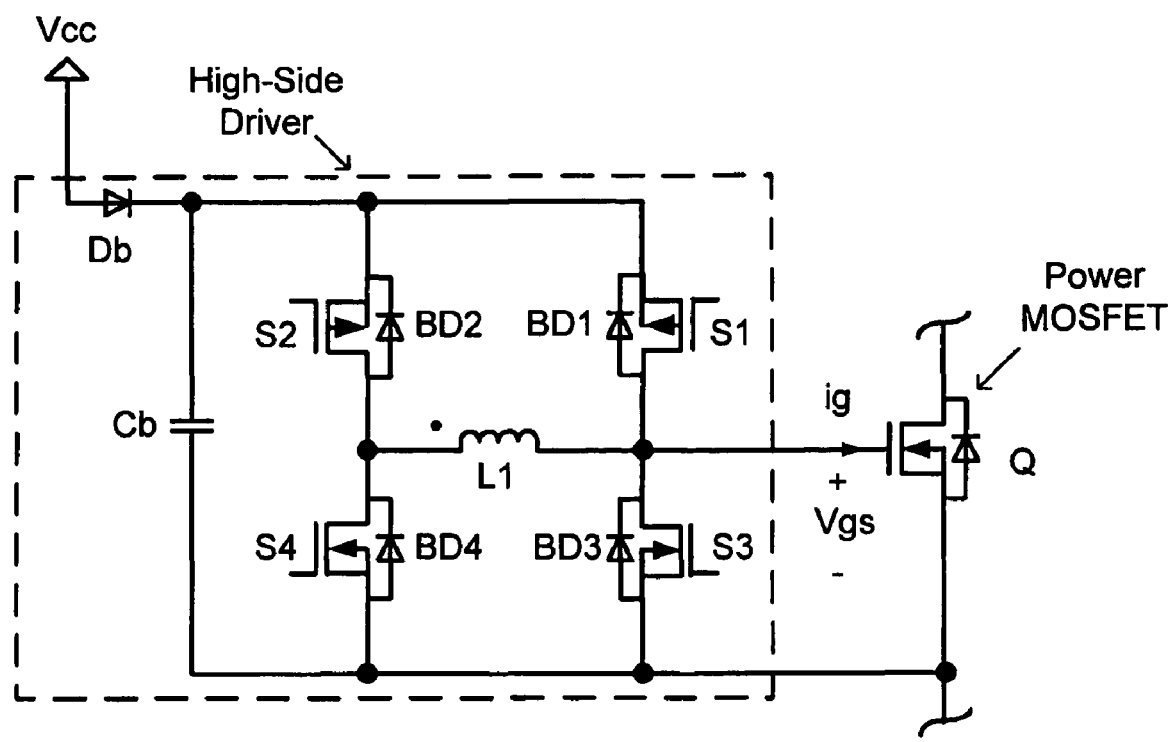
FIG. 23 is a schematic diagram of the circuit of FIG. 21 adapted for use as a high-side driver.

This resonant gate driver may be adapted for high-side drive of non-ground referenced MOSFET switches using a bootstrap circuit consisting of a diode, Db, and capacitor, Cb, as illustrated in FIG. 23. The equivalent gate capacitance of the power switch Q is not shown.

4.5 Dual High-Side and Low-Side Drive Implementation

Figure 24A:
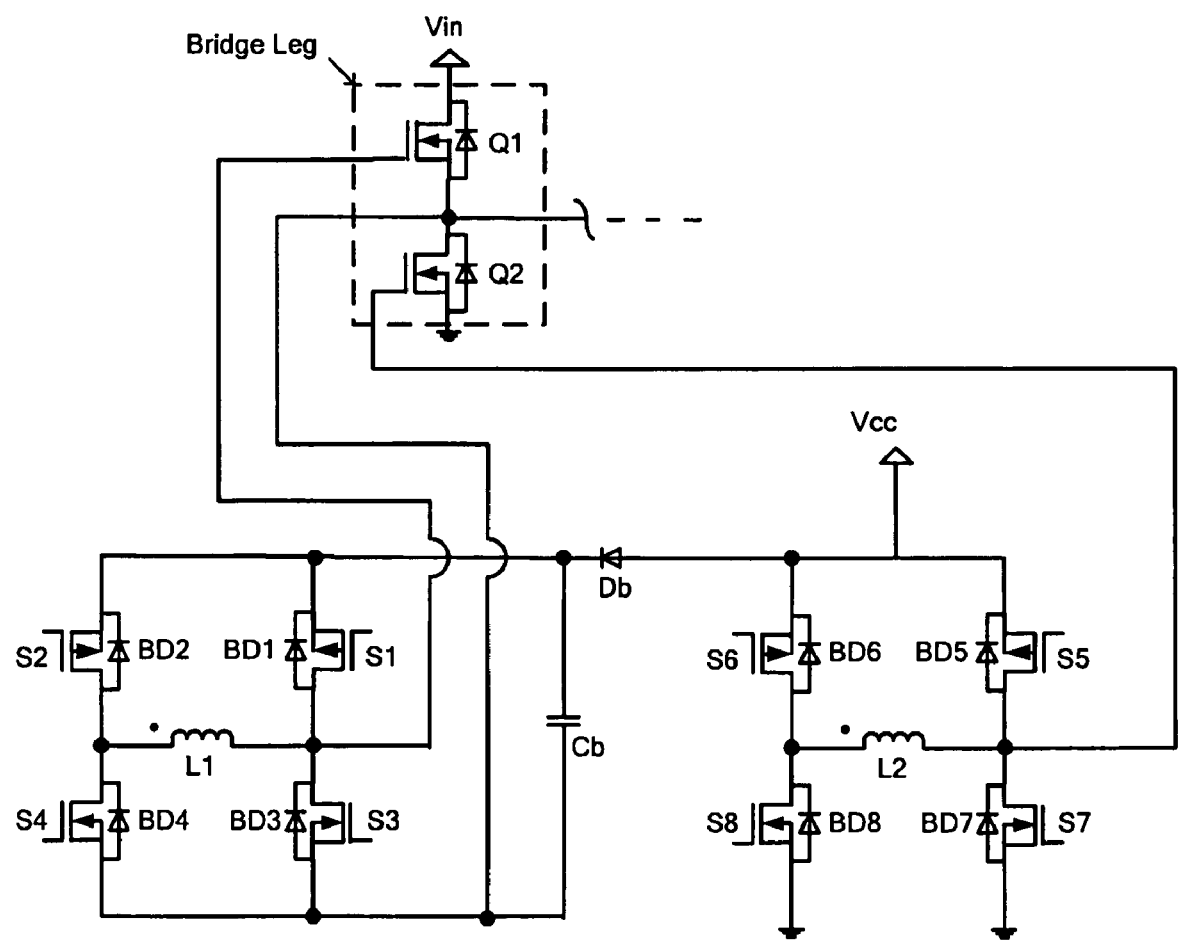
FIG. 24(a) is a schematic diagram showing the embodiments of FIGS. 21 and 23 adapted for driving a bridge leg.
Figure 24B:
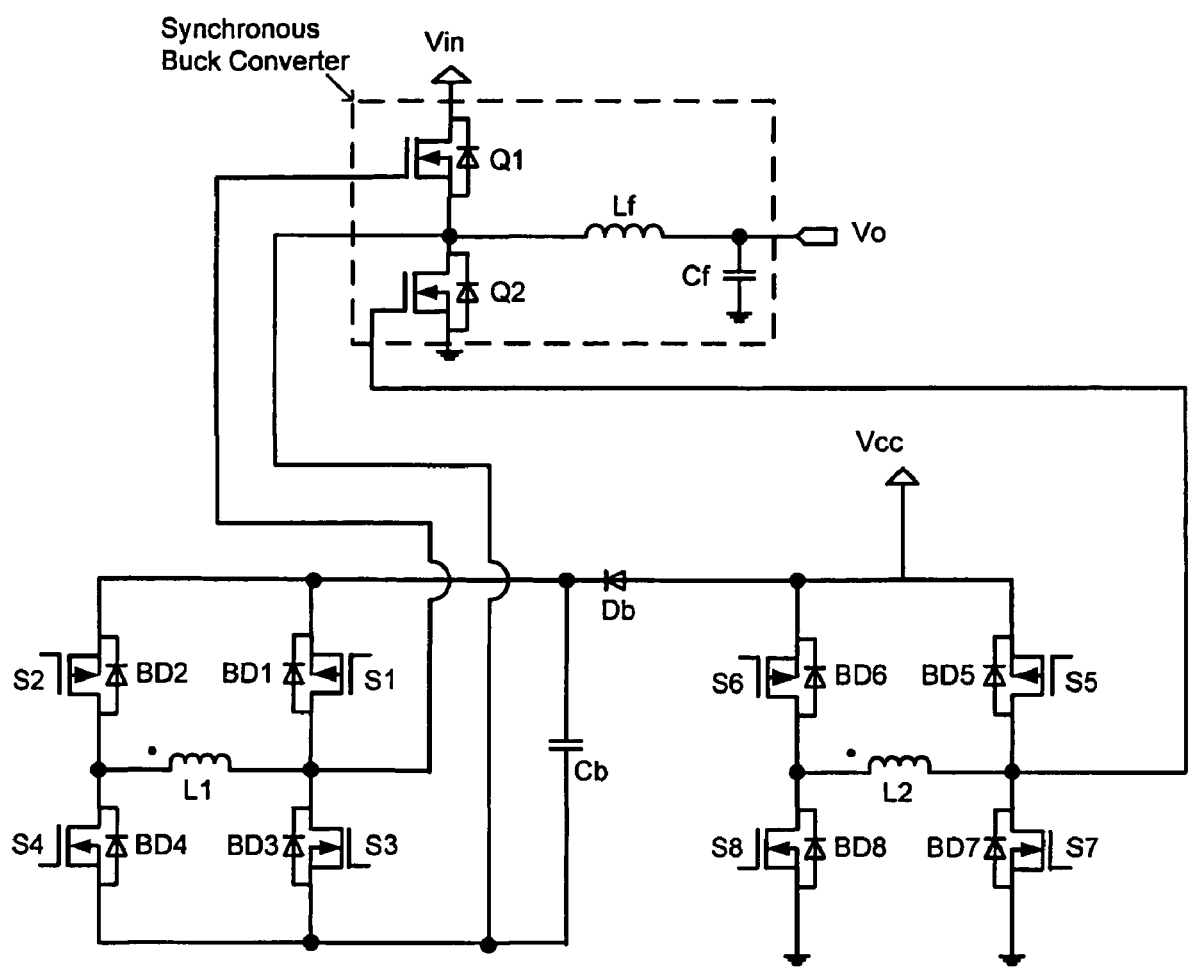
FIG. 24(b) is a schematic diagram showing the embodiment of FIG. 24(a) adapted for driving a buck converter.

The high-side driver shown in FIG. 23 may be utilized along with the low-side driver of FIG. 21 to drive both switches in a bridge-leg configuration, such as, for example, a synchronous buck converter, a full-bridge converter, a half-bridge converter, an active clamp forward converter, or a resonant converter with a full-bridge or half-bridge inverter. An example of such a circuit for driving a bridge leg is shown in FIG. 24(a), where the equivalent gate capacitances of the power switches Q1 and Q2 are not shown. The bridge leg may be, for example, that of a synchronous buck converter, as shown in FIG. 24(b). When implemented in a bridge-leg configuration, the gate driver allows independent control of the switching speed of the two switches of the buck converter.

Figure 24C:
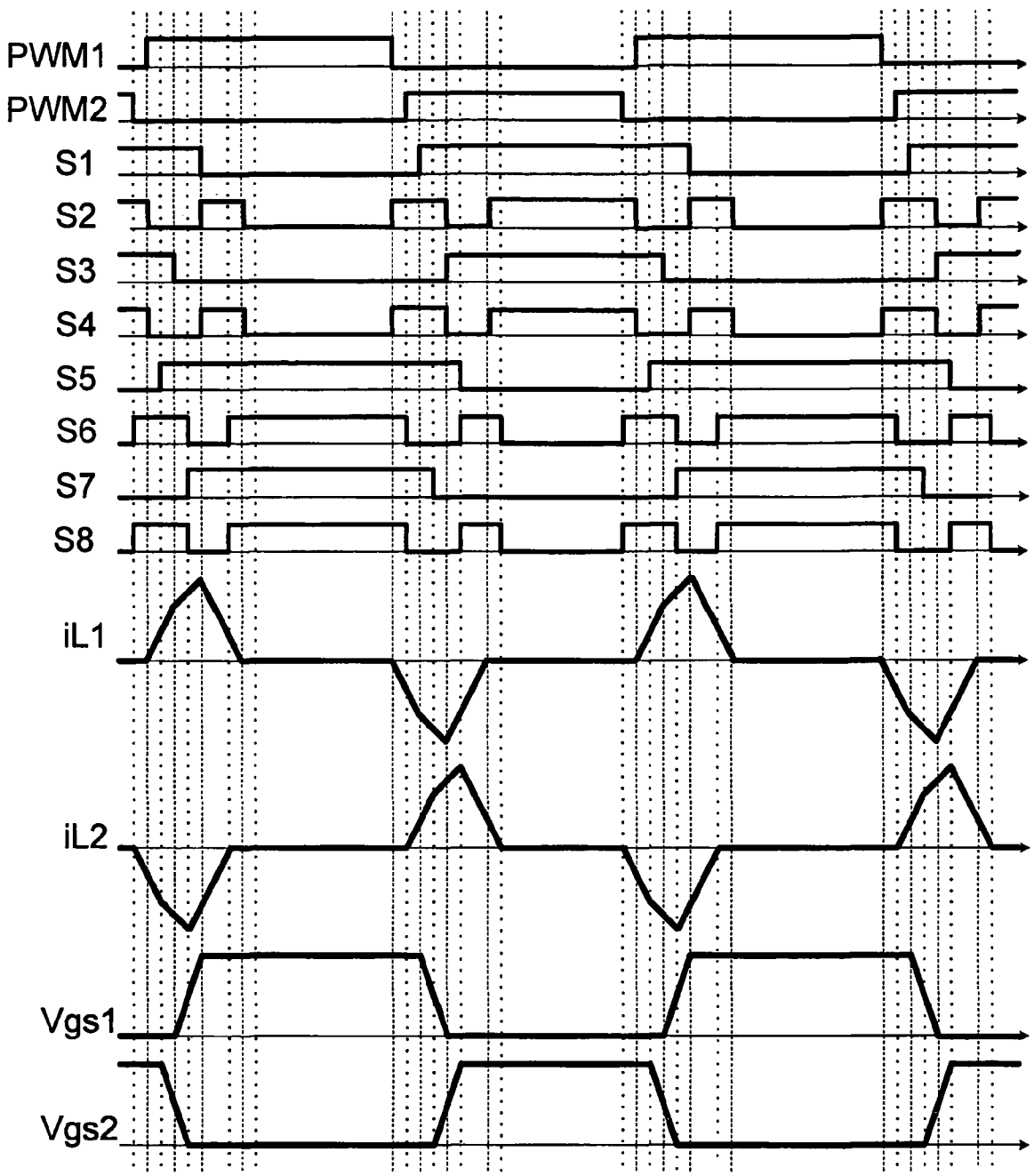
FIG. 24(c) is a plot showing key waveforms for the circuit of FIG. 24(b)

Exemplary waveforms for the circuit of FIG. 24(b) to drive a synchronous buck converter are shown in FIG. 24(c). The input signals are the PWM signal for the power switch Q1, labelled PWM1, and its complement PWM2 for Q2, with a small dead time between PWM1 and PWM2. The eight control switch gating signals are labelled S1-S8. The current waveforms for the two inductors L1 an L2 are labelled iL1 and iL2. The gate-to-source voltage for MOSFET Q1 is labelled Vgs1 and the gate-to-source voltage for the synchronous rectifier MOSFET Q2 is labelled Vgs2.

4.6 Control Logic Example

An embodiment of the logic required to produce gating signals for the four control switches S1-S4 will now be described. The first point to be noted from FIG. 22(a) is that S2 and S4 operate complementarily. However, since a P-channel switch is used for S2, the same logic may be used to generate the gating signals for both switches, which simplifies the logic design and reduces the gate count requirement.

Figure 25A:
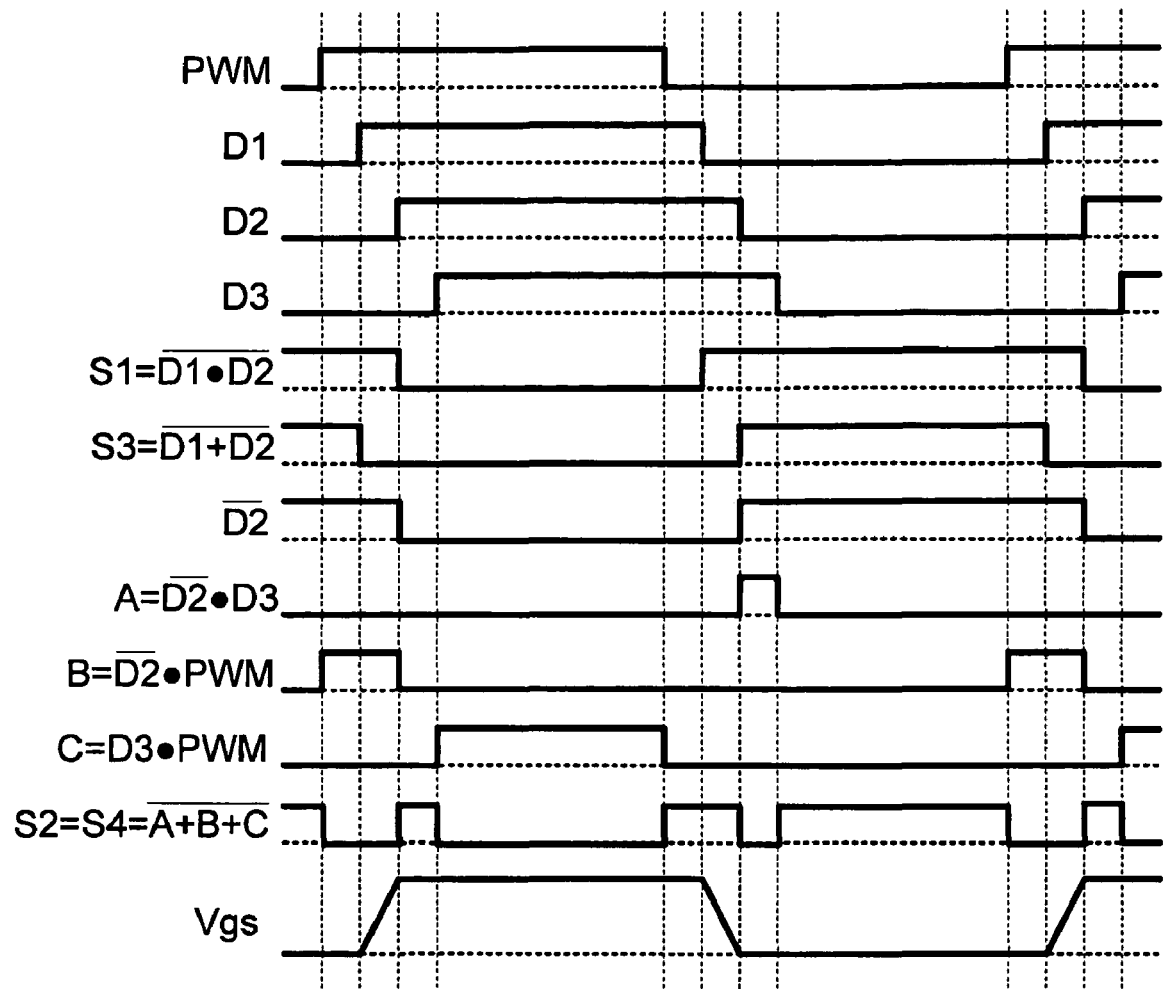
FIG. 25(a) shows the logic waveforms used to create the gating signals for control switches S1 to S4 of FIG. 21, to generate the waveforms of FIG. 22(a)
Figure 26A:
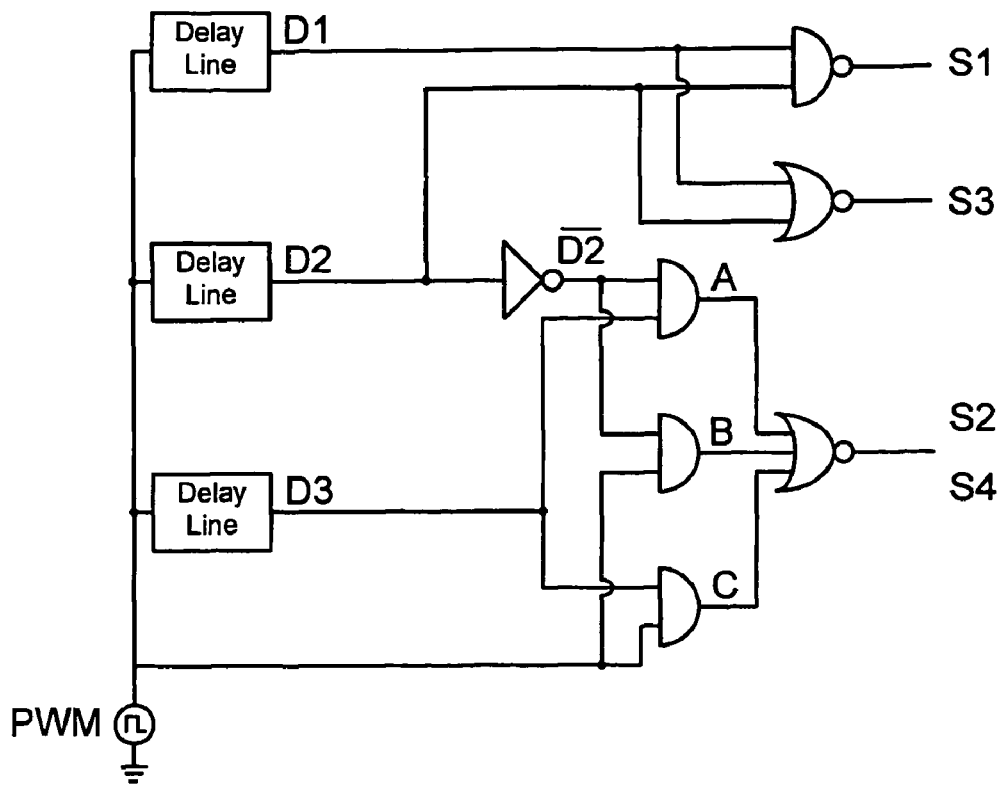
FIGS. 26(a)-(d) are schematic diagrams of logic circuits used to create the control switch gating signals shown in FIGS. 25(a)-(d), respectively.

Logic waveforms used to create the three control signals for S1-S4 of FIG. 22(a) are showed in FIG. 25(a). The only logic input to the gate drive circuit is a PWM signal generated by a converter controller. To implement appropriate pre-charging intervals, gate charging intervals, and energy return intervals, delay circuitry is required to delay the PWM signal for the appropriate times. The delayed signals are labeled D1-D3 in FIG. 25(a). The required gating signals for S1-S4 are shown after the PWM signal and these signals were created using the logic circuit shown in FIG. 26(a).

Control Logic for Reduced Pulse Embodiment 1 (2-Pulse)

Figure 25B:
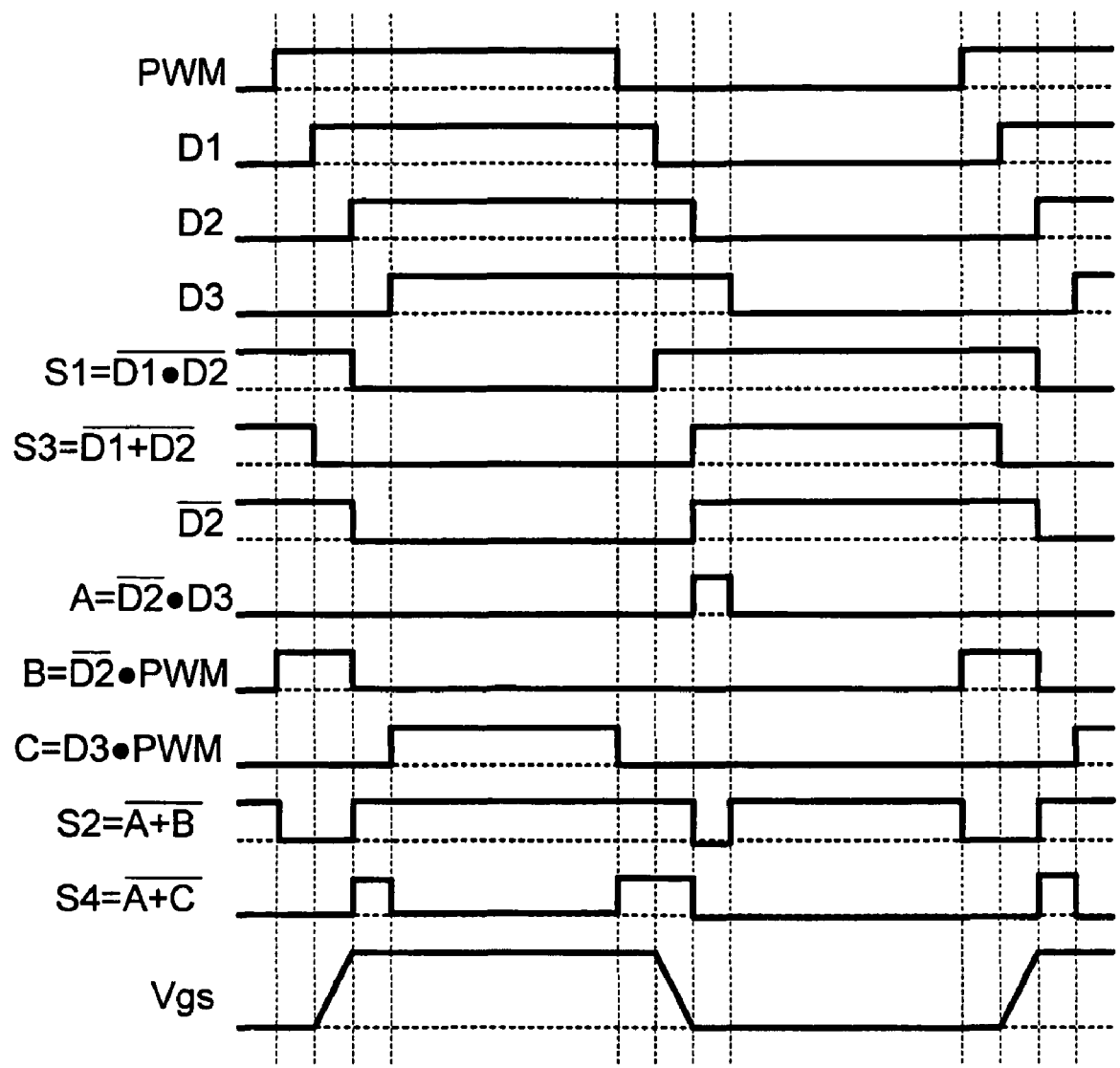
FIG. 25(b) shows the logic waveforms used to create the gating signals for control switches S1 to S4 of FIG. 21, to generate the waveforms of FIG. 22(b)
Figure 26B:
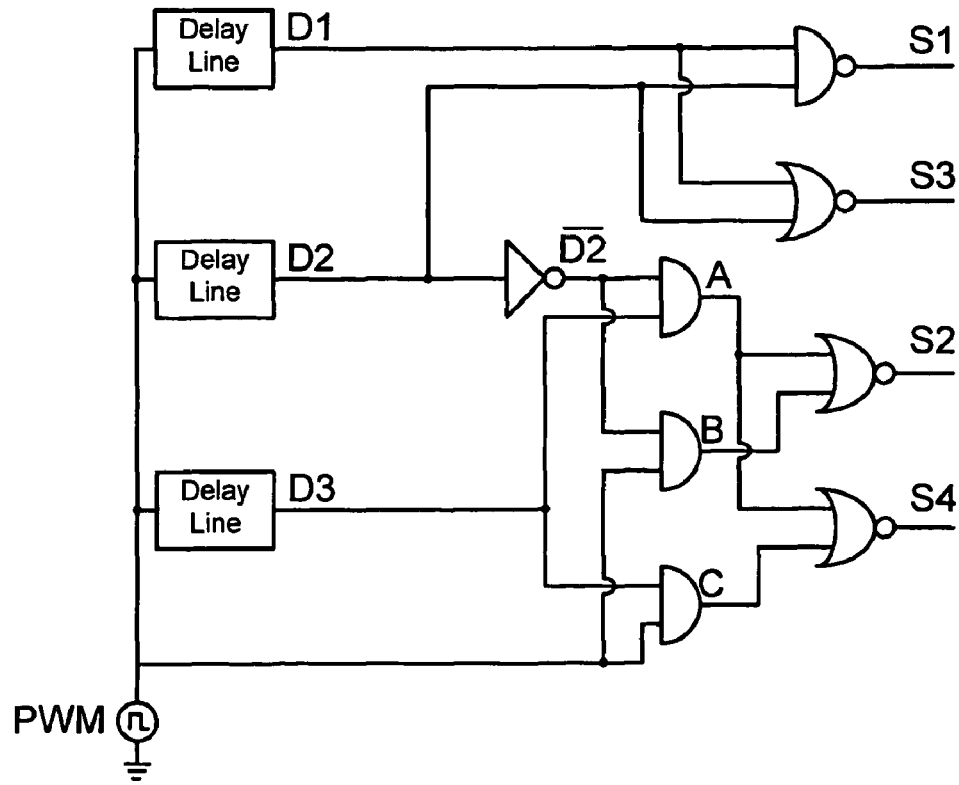

The logic waveforms used to create the four control signals for S1-S4 (FIG. 22(b)) of reduced pulse embodiment 1 are shown in FIG. 25(b). The required gating signals for S1-S4 are shown after the PWM signal and these signals were created using the logic circuit shown in FIG. 26(b).

Control Logic for Reduced Pulse Embodiment 2 (2-Pulse)

Figure 25C:
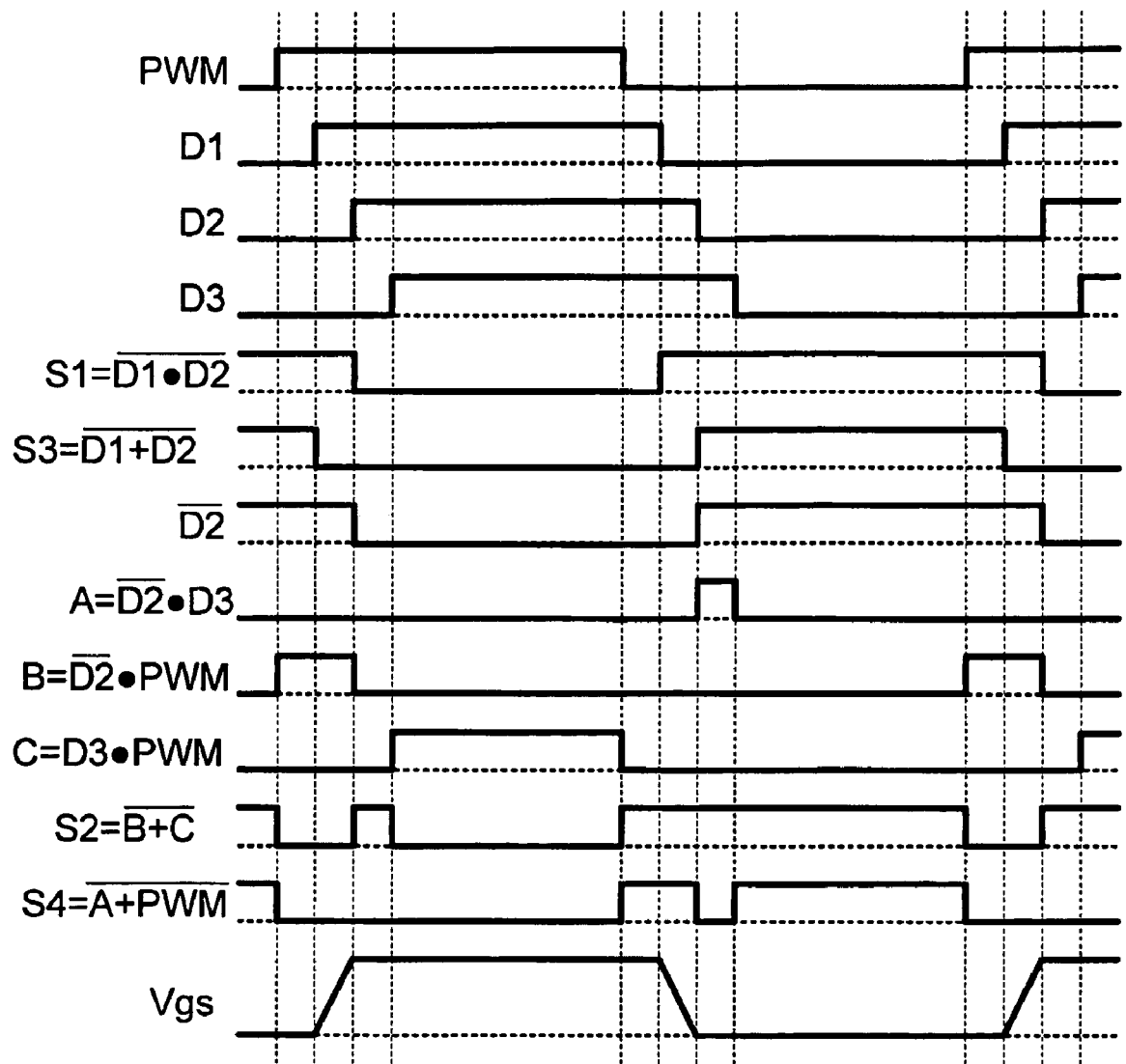
FIG. 25(c) shows the logic waveforms used to create the gating signals for control switches S1 to S4 of FIG. 21, to generate the waveforms of FIG. 22(c)
Figure 26C:
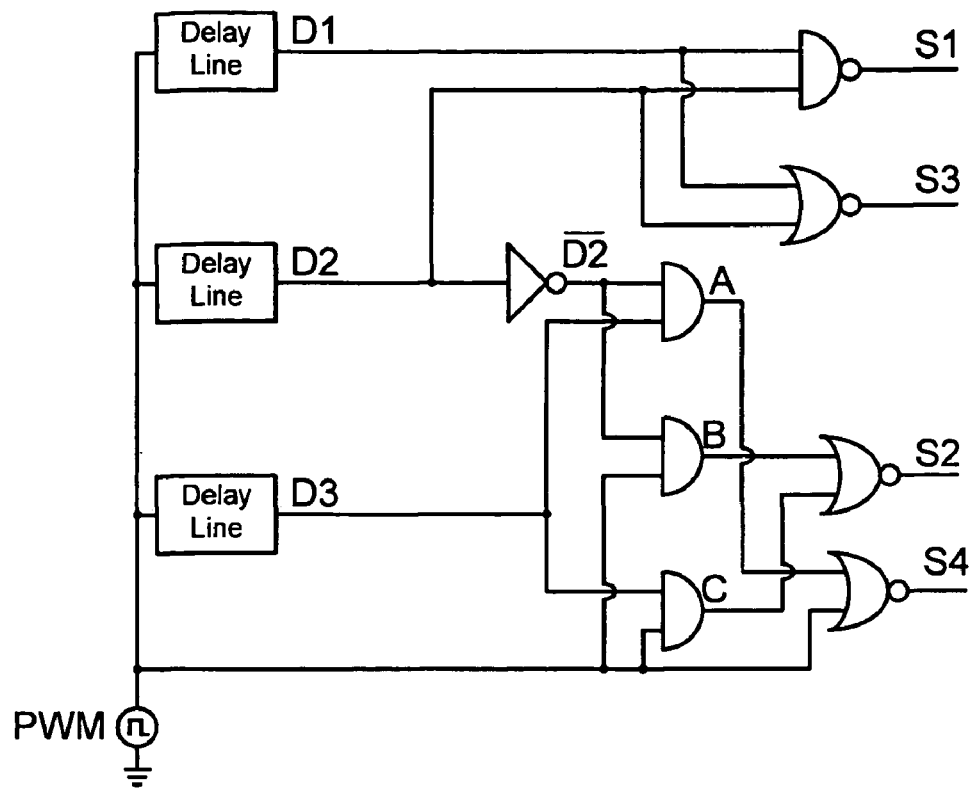

The logic waveforms used to create the four control signals for S1-S4 (FIG. 22(c)) of reduced pulse embodiment 2 are shown in FIG. 25(c). The required gating signals for S1-S4 are shown after the PWM signal and these signals were created using the logic circuit shown in FIG. 26(c).

Control Logic for Reduced Pulse Embodiment 3 (1-Pulse)

Figure 25D:
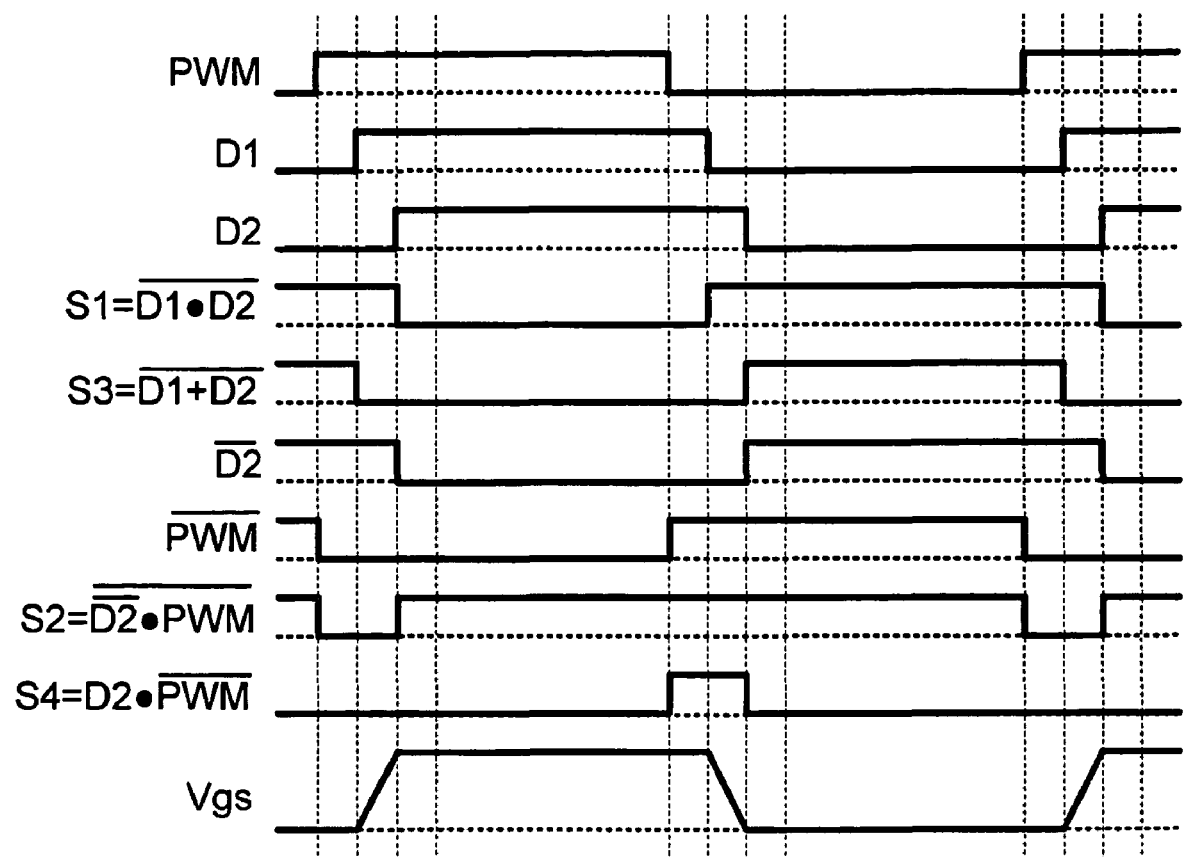
FIG. 25(d) shows the logic waveforms used to create the gating signals for control switches S1 to S4 of FIG. 21, to generate the waveforms of FIG. 22(d)
Figure 26D:
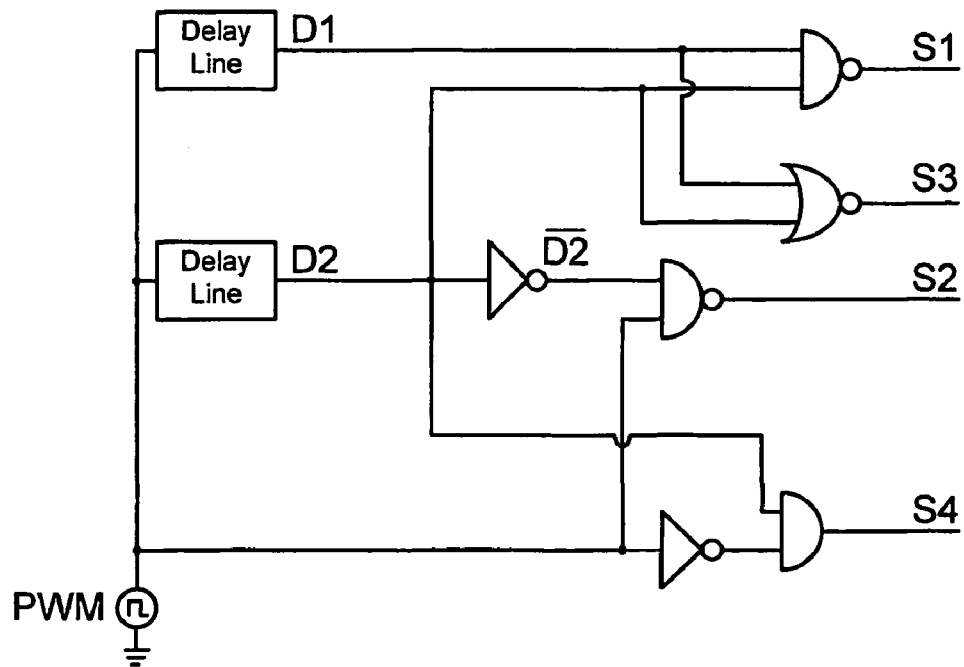

The logic waveforms used to create the four control signals for S1-S4 (FIG. 22(d)) of reduced pulse embodiment 3 are shown in FIG. 25(d). The required gating signals for S1-S4 are shown after the PWM signal and these signals were created using the logic circuit shown in FIG. 26(d).

4.7 Design Example and Simulation Results

An isolated switching power converter, such as that shown in FIG. 15, was designed to operate at 1.5 MHz to deliver power to a 35 A load at 1 V. Two pairs of synchronous rectifier (SR) power MOSFETs were used in the secondary side rectifier stage. The peak reverse voltage on the SRs was 4 V and their gates were driven by a 5 V source. The power MOSFET Q and control switches S1-S4 were selected and their relevant parameters are given in Table 1. The turn on transition time was selected to be 10% of the switching period, corresponding to F=0.1.

TABLE 1

Switch parameters for the resonant gate driver.

| Label | # Req Per Driver | Part # | $R_{DS}$ @ $V_{gs}$ = 4.5 V [Ω] | $Q_G$ @ $V_{DS}$ = 4 V [nC] | $Q_g$ @ $V_{DS}$ = 5 V [nC] | $R_g$ [W] |
|---|---|---|---|---|---|---|
| Q | 2 | IRF6691 | NA | 2(40) = 80($Q_g$) | NA | 0.6/2 = 0.3 ($R_G$) |
| S1 | 1 | FDN342P | 0.062 ($R_1$) | NA | 3.15 | NA |
| S2 | 1 | Si3585DV | 0.160 ($R_2$) | NA | 1.35 ($Q_{G2}$) | NA |
| S4 | | | 0.100 ($R_4$) | | 1.05 ($Q_{G4}$) | |
| S3 | 1 | FDN335N | 0.055 ($R_3$) | NA | 1.75 | NA |

Additional circuit parameters used to calculate the optimal inductance value and conduction loss are summarized in Table 2.

TABLE 2

Additional circuit parameters for the resonant gate drive circuit.

| Label | Value |
|---|---|
| $V_{CC}$ | 5 V |
| F | 0.1 |
| $f_S$ | 1.5 MHz |
| $R_L$ | 0.05 Ω |
| $R_a$ | $R_2 + R_L + R_3 = 0.265$ Ω |
| $R_b$ | $R_2 + R_L + R_g = 0.51$ Ω |
| $R_c$ | $R_4 + R_L + R_1 = 0.212$ Ω |

Using the parameters in Tables 1 and 2 along with equation (1), the optimal inductance value was calculated to be L=170 nH. The required transition times were calculated to be $t_a$=24 ns using equation (2), $t_b$=$t_{on}$=67 ns using equation (3), and $t_c$=58 ns using equation (4), corresponding to required delay times of $t_{d1}$=24 ns, $t_{d2}$=90 ns, and $t_{d3}$=149 ns for the PWM signal.

$$L = \frac{V_{CC}}{Q_g}\left(\frac{F}{2f_s}\right)^2 \quad (1)$$

$$\left\{\frac{(R_a + R_c)^{2/3} + \left(4R_b + R_c - R_a + 2\sqrt{-R_cR_a + 4R_b^2 + 2R_bR_c - 2R_bR_a}\right)^{2/3}}{(R_a + R_c)^{1/3} \left(4R_b + R_c - R_a + 2\sqrt{-R_cR_a + 4R_b^2 + 2R_bR_c - 2R_bR_a}\right)^{1/3}}\right\}$$

$$t_a = \frac{L_R}{V_{CC}}\left[\frac{Q_g f_s}{F} - \frac{V_{CC}}{4}\frac{F}{f_s}\frac{1}{L}\right] \quad (2)$$

$$t_{on} = \frac{F}{f_s} \quad (3)$$

$$t_c = \frac{L}{V_{CC}}\left[\frac{Q_g f_s}{F} - \frac{V_{CC}}{4}\frac{F}{f_s}\frac{1}{L}\right] \quad (4)$$

$$P_{cond} = \quad (5)$$
$$2\left(\frac{f_s}{3}R_a\frac{L}{V_{CC}}\left[\frac{Q_g f_s}{F}\frac{V_{CC}}{4}\frac{F}{f_s}\frac{1}{L}\right]^3 + FR_b\left[\left(\frac{f_s Q_g}{F}\right)^2 + \frac{1}{12}\left(\frac{V_{CC}F}{2f_sL}\right)^2\right] + \frac{f_s}{3}R_a\frac{L}{V_{CC}}\left[\frac{Q_g f_s}{F} + \frac{V_{CC}}{4}\frac{F}{f_s}\frac{1}{L}\right]^3\right)$$

$$P_{gQ2Q4} = 3f_s(Q_{g2}+Q_{g4})V_{CC} \quad (6)$$

$$P_{gate} = Q_g V_{CC} f_s \quad (7)$$

The total conduction loss in the driver was 194 mW, calculated using equation (5). The additional gate loss attributed to S2 and S4 was 54 mW, calculated using equation (6). Since two drive circuits are required for the converter because there are two pairs of SRs, the total conduction loss and additional gate loss quantities were doubled and were 388 mW and 108 mW, respectively. The total loss using the method described herein was 496 mW. The total gate loss using a conventional gate driver was 1.2 W, calculated using equation (7) with four IRF6691 SRs in the rectifier. Therefore, if the core loss of the inductors is neglected, the efficiency of the gate driver of this embodiment was 59%. The total power savings was 704 mW for the given application, which represents 2% of the total load power, which is significant given the high operating efficiencies of present day converters.

Figure 27:
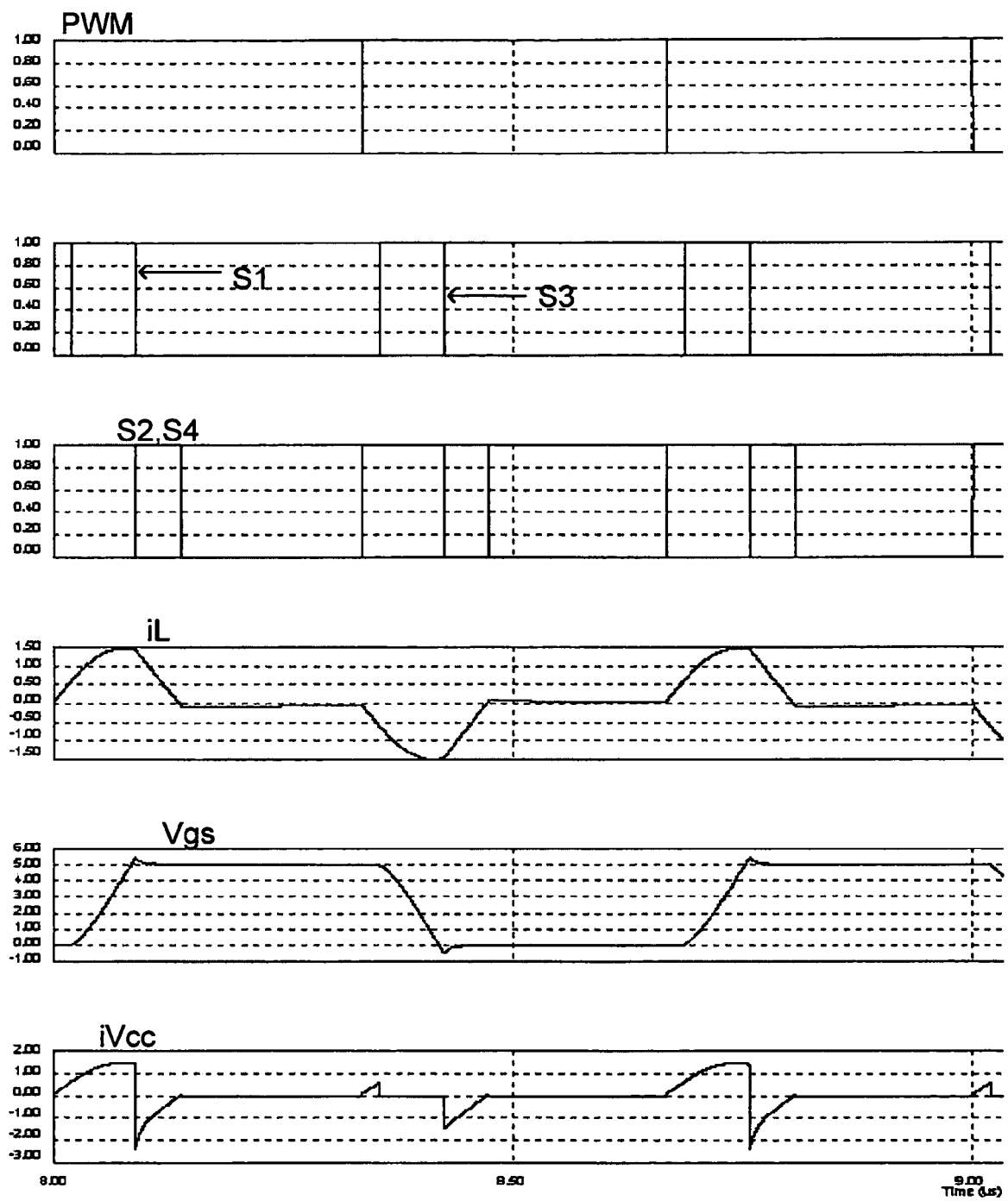
FIG. 27 is a plot showing simulation results using PSIM 5.0 for a gate driver with a 1.5 MHz switching frequency (the traces are: top: PWM; second: S1 and S3 gate signals; third: S2 and S4 gate signals; fourth: $L_R$ current; fifth: power MOSFET gate voltage; bottom: line current from $V_{CC}$).

PSIM 5.0 was used to simulate the resonant gate driver, using the parameters given above. The simulation waveforms are shown in FIG. 27. The waveforms from the top down are: 1) the PWM signal, 2) the S1 and S3 gate waveforms, 3) the S2 and S4 gate waveforms which overlap, 4) the inductor current waveform, 5) the power MOSFET Q gate-to-source voltage approximating the gate as a series resistance and capacitance, and 6) the line current. The average line current was measured to be 39 mA, which represents a total conduction loss in the circuit of 195 mW, which agrees with the value of 194 mW calculated above.

The contents of all cited patents, patent applications, and publications are incorporated herein by reference in their entirety.

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

We claim:

1. A method of controlling operation of at least one power switching device having a gate capacitance, comprising:
    (i) charging the gate capacitance of a said power switching device using a current source connected directly to the gate capacitance of the power switching device, so that the power switching device is switched on, and then clamping the gate capacitance of the power switching device to a voltage source via a first low impedance path while the power switching device is on; and
    (ii) discharging the gate capacitance of the said power switching device using a current source connected directly to the gate capacitance of the power switching device, so that the power switching device is switched off, and then clamping the gate capacitance of the power switching device to a low voltage via a second low impedance path while the power switching device is off;

wherein the current source is an inductor or an inductor connected in series with a capacitor;
wherein energy stored in the gate capacitance of the at least one power switching device is recovered;
wherein the gate capacitance is directly between a gate and a source, an emitter, or a cathode of the at least one power switching device and is part of the at least one power switching device; and
wherein the at least one power switching device is selected from MOSFET, IGBT, and MCT.

2. The method of claim 1, further comprising:
carrying out steps (i) and (ii) on first and second power switching devices independently.

3. The method of claim 1, further comprising:
carrying out steps (i) and (ii) on first and second power switching devices such that the first power switching device is switched off and on again while the second power switching device is on, and the second power switching device is switched off and on again while the first power switching device is on.

4. The method of claim 1, wherein at least one power switching device is a MOSFET.

5. The method of claim 1, wherein at least one power switching device comprises a plurality of power switching devices connected in parallel.

6. The method of claim 1, wherein the low voltage is approximately ground of the circuit.

7. The method of claim 1, wherein the low voltage is equal to or lower than that required to maintain the at least one power switching device in an off-state.

8. A resonant gate drive circuit for controlling operation of at least one power switching device having a gate capacitance, comprising:
a current source consisting of comprising an inductor or an inductor connected in series with a capacitor; and
a switching circuit for connecting the current source directly to the gate capacitance of the at least one power switching device, for clamping the gate capacitance of the at least one rower switching device to a voltage source via a first low impedance path while the at least one power switching device is on, and for clamping the gate capacitance of the at least one power switching device to a low voltage via a second low impedance path while the at least one power switching device is off, at selected instants in time;
wherein the gate capacitance is directly between a gate and a source, an emitter, or a cathode of the at least one power switching device and is part of the at least one power switching device; and
wherein the at least one power switching device is selected from MOSFET, IGBT, and MCT.

9. The resonant gate drive circuit of claim 8, wherein the switching circuit comprises a plurality of switches that direct the flow of current to charge and discharge the gate capacitance of the at least one power switching device.

10. The resonant gate drive circuit of claim 8, wherein the switching circuit comprises four switches connected in a full bridge configuration, that direct the flow of current to charge and discharge the gate capacitance of the at least one power switching device.

11. The resonant gate drive circuit of claim 10, wherein the current source is connected across the bridge.

12. The resonant gate drive circuit of claim 8, wherein the low voltage is approximately ground of the circuit.

13. The resonant gate drive circuit of claim 8, wherein the low voltage is equal to or less than the voltage required to maintain the at least one power switching device in an off-state.

14. The resonant gate drive circuit of claim 8, wherein at least one power switching device comprises a plurality of power switching devices connected in parallel.

15. The resonant gate drive circuit of claim 8, wherein the power switching device is a MOSFET.

16. The resonant gate drive circuit of claim 8, further comprising:
an input terminal for receiving a DC voltage;
wherein the switching circuit comprises:
(i) a first leg connected between the input terminal and a circuit common, the first leg comprising two switches connected in series at a first node; and
(ii) a second leg connected between the input terminal and the circuit common, the second leg comprising two switches connected in series at a second node;
wherein the current source is connected between the first node and the second node;
wherein the gate capacitance of a first power switching device is connected between the first node and the circuit common, and the gate capacitance of a second power switching device is connected between the second node and the circuit common.

17. The resonant gate drive circuit of claim 8, further comprising:
an input terminal for receiving a DC voltage;
a diode having a first terminal connected to the input terminal, and a second terminal;
wherein the switching circuit comprises
(i) a first leg connected between the second terminal of the diode and a floating point, the first leg comprising two switches connected in series at a first node; and
(ii) a second leg connected between the input terminal and a circuit common, the second leg comprising two switches connected in series at a second node;
wherein the current source is connected between the first node and the second node;
the circuit further comprising a capacitor connected between the second terminal of the diode and the floating point;
wherein the gate capacitance of a first power switching device is connected between the first node and the floating point, and the gate capacitance of a second power switching device is connected between the second node and the circuit common.

18. A method of controlling operation of the low-side and high-side power switching devices of a synchronous buck converter, comprising:
connecting the gate capacitance of the low-side power switching device of the buck converter between the second node of the circuit of claim 17 and the circuit common; and
connecting the gate capacitance of the high-side power switching device of the buck converter between the first node of the circuit of claim 17 and the floating point.

19. The method of claim 1, wherein at least one power switching device is an IGBT.

20. The method of claim 1, wherein at least one power switching device is a MCT.

21. The resonant gate drive circuit of claim 8, wherein at least one power switching device is an IGBT.

22. The resonant gate drive circuit of claim 8, wherein at least one power switching device is a MCT.

23. The resonant gate drive circuit of claim 8, wherein connecting controls independently the operation of two power switching devices.

24. The resonant gate drive circuit of claim 8, comprising:
an input terminal for receiving a DC voltage;
wherein the switching circuit comprises:
(i) a first leg connected between the input terminal and a circuit common, the first leg comprising two switches connected in series at a first node; and
(ii) a second leg connected between the input terminal and the circuit common, the second leg comprising two switches connected in series at a second node;
wherein the current source is connected between the first node and the second node;
wherein the gate capacitance of a power switching device is connected between the first node or the second node and the circuit common.

25. The resonant gate drive circuit of claim 8, comprising:
an input terminal for receiving a DC voltage;
a diode having a first terminal connected to the input terminal, and a second terminal;
wherein the switching circuit comprises
(i) a first leg connected between the second terminal of the diode and a floating point the first leg comprising two switches connected in series at a first node; and
(ii) a second leg connected between the second terminal of the diode and the floating point, the second leg comprising two switches connected in series at a second node;
wherein the current source is connected between the first node and the second node;
the circuit further comprising a capacitor connected between the second terminal of the diode and the floating point;
wherein the gate capacitance of the power switching device is connected between the first node and the floating point.

26. A method of controlling operation of a low-side power switching device of a synchronous buck converter, comprising:
connecting a gate capacitance of the low-side power switching device of the buck converter between the first or second node of the circuit of claim 24 and the circuit common; and
(i) charging the gate capacitance of the power switching device using the current source, so that the power switching device is switched on, and then clamping the gate capacitance of the power switching device to a voltage source via a first low impedance path while the power switching device is on; and
(ii) discharging the gate capacitance of the power switching device using a current source, so that the power switching device is switched off, and then clamping the gate capacitance of the power switching device to a low voltage via a second low impedance path while the power switching device is off.

27. A method of controlling operation of a high-side power switching device of a synchronous buck converter, comprising:
connecting a gate capacitance of the high-side power switching device of the buck converter between the first node or the second node of the circuit of claim 25 and the floating point; and
(i) charging the gate capacitance of the power switching device using the current source, so that the power switching device is switched on, and then clamping the gate capacitance of the power switching device to a voltage source via a first low impedance path while the power switching device is on; and
(ii) discharging the gate capacitance of the power switching device using a current source, so that the power switching device is switched off, and then clamping the gate capacitance of the power switching device to a low voltage via a second low impedance path while the power switching device is off.

28. The circuit of claim 24, wherein the power switching device is a low-side power switching device of a synchronous buck converter.

29. The circuit of claim 25, wherein the power switching device is a high-side power switching device of a synchronous buck converter.

* * * * *

UNITED STATES PATENT AND TRADEMARK OFFICE
CERTIFICATE OF CORRECTION

PATENT NO. : 7,598,792 B2  Page 1 of 1
APPLICATION NO. : 11/266486
DATED : October 6, 2009
INVENTOR(S) : Yan-Fei Liu, Zhihua Yang and Wilson Eberle It is certified that error appears in the above-identified patent and that said Letters Patent is hereby corrected as shown below:

Column 21, Claim 8, Line 34
"consisting of comprising an inductor" should be --consisting of an inductor--

Column 21, Claim 8, Line 39
"the at least one rower switching" should be --the at least one power switching--

Column 23, Claim 25, Line 24
"floating point the first leg" should be --floating point, the first leg--

Signed and Sealed this

Fifteenth Day of June, 2010

David J. Kappos
*Director of the United States Patent and Trademark Office*